United States Patent
Suzuki et al.

(10) Patent No.: US 6,344,924 B1
(45) Date of Patent: *Feb. 5, 2002

(54) OPTICAL FIBER AMPLIFIER AND OUTPUT POWER FLATTENING METHOD OF OPTICAL FIBER AMPLIFIER

(75) Inventors: Mikiya Suzuki; Shigeru Shikii, both of Tokyo (JP)

(73) Assignee: Oki Electric Industry, Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,019

(22) Filed: Apr. 26, 1999

(30) Foreign Application Priority Data

Apr. 27, 1998 (JP) .......................................... 10-116540

(51) Int. Cl.$^7$ .............................. G02B 6/10; H01S 3/06
(52) U.S. Cl. .................. 359/337.1; 359/174; 359/337.4
(58) Field of Search ............................... 359/161, 174, 359/177, 337, 341, 337.1, 337.4

(56) References Cited

U.S. PATENT DOCUMENTS

| | | |
|---|---|---|
| 5,131,069 A | 7/1992 | Hall et al. |
| 5,530,584 A | 6/1996 | Myslinski et al. |
| 5,731,892 A | * 3/1998 | DiGiovanni et al. ........ 359/177 |
| 5,764,406 A | * 6/1998 | Newhouse et al. ......... 359/341 |

FOREIGN PATENT DOCUMENTS

| | | |
|---|---|---|
| JP | 05107573 | 4/1993 |
| JP | 09043647 | 2/1997 |
| WO | WO 93/09581 | 5/1993 |
| WO | 97/23066 | * 6/1997 |

OTHER PUBLICATIONS

Laming et al, EOCON '93, Fiber optic Common–Conference Proceedings, pp. 35–39, Jul. 2, 1993.*
Inoue et al, IEEE Photonics Technology Letters, 3, 1991 #8, pp 719–720, Aug. 1991.*
Tafa et al, IEEE Photonics Technology Letters, vol 5, #2, pp 248–351, Feb. 1993.*

(List continued on next page.)

Primary Examiner—Nelson Moskowitz
(74) Attorney, Agent, or Firm—Venable; James Burdett

(57) ABSTRACT

Optical fiber amplifiers with a simple composition than can accurately flatten optical output power in a fixed range are provided. Main optical amplifiers and first gain equalizers connected to these amplifiers are disposed between input port and output port. The main optical amplifiers comprise first EDFs which function as first amplification optical fibers, pumping light sources for providing pumping to drive the first EDFs using amplification characteristics, and second isolators. It is preferable for the second isolators to be isolators that can eliminate optical pumping power. The first gain equalizers are comprised by second absorption EDF. This second EDF operates such that the gain of the optical signal decreases in a non-pumping state or in a slight pumping state. The amplification characteristics used by the first EDF to amplify the optical signal power are opposite to the absorption characteristics used by the second EDF to absorb the optical signal power. Therefore, by means of passing a Wavelength Division Multiplexing Signal (WDM) through the first and second EDFs, only the portion of the Wavelength Division Multiplexing Signal (WDM) output from the first EDF that corresponds to the signal amplified by the first EDF is absorbed while a Wavelength Division Multiplexing Signal (WDM) passes through the second EDF. Because of this, the gain of the Wavelength Division Multiplexing Signal (WDM) ultimately output from an optical fiber amplifier is flattened.

31 Claims, 15 Drawing Sheets

OTHER PUBLICATIONS

Giles et al, Optical Amplifiers and their Application, 1990 Tech. Digest, vol. 13, IEEE, Aug. 8, 1990.*

Laming et al., EOCON '93, Fiber of the Common Conference Proceedings, pp. 35–39.

Liaw et al., "Passive Gain–Equalized Wide–Band Erbium–Doped Fiber Amplifier Using Samarium–Doped Fiber", IEEE Photonics Technology Letters, vol. 8, No. 7, Jul. 1996, pp. 879–881.

"Hikarizofukuki to Sono Oyo" Ohm Corporation published May 30, 1992, pp. 99–123.

"Erbium–Doped Fiber Amplifiers" Emmanuel Desurvire, pp. 9–16 and 318–337, published by Interscience John Wiley & Sons, Inc.

Chen et al., "Optinum Gain–Equalised Configuration of Wideband Erbium–doped Fibre amplifier using interstage samarium–doped fibre and midway isolor" Electronics Letters, vol. 32, No. 23, Nov. 7, 1996, pp. 2175–2177.

Inoue et al., IEEE Phtonics Technology Letters, vol. 3 (8), 1991, pp. 719–720.

Taba et al., IEEE Photonics Technology Letters, vol. 5(2), 1993 pp. 248–351.

Giles et al., "Optical Amplifiers and their application" Tech Digest, vol. 13, 1990.

* cited by examiner

10A:FP-EDFA

10B:BP-EDFA

10C:BDP-EDFA a:1530.33nm
b:1531.90nm
c:1533.47nm
d:1535.04nm
Q:ΔG e:1538.19nm
f:1539.77nm
g:1541.35nm
h:1542.94nm
R:ΔG

OPTICAL FIBER AMPLIFIER AND OUTPUT POWER FLATTENING METHOD OF OPTICAL FIBER AMPLIFIER

BACKGROUND OF THE INVENTION

1. Field of the Invention

The present invention relates to optical fiber amplifiers and in particular, to optical fiber amplifiers which flatten the power of optical signals which are amplified from the optical fiber amplifiers and will be output extending over a wide wavelength range and a wide optical input power range as well as a method that flattens the power of optical signals which will be output from the optical fiber amplifiers.

2. Description of Related Art

Optical fiber amplifiers include, for example, erbium-doped optical fiber amplifiers, praseodymium-doped optical fiber amplifiers, neodymium-doped optical fiber amplifiers and optical fiber amplifiers doped with other rare earth elements. For instance, production of erbium-doped optical fiber amplifiers, research into their characteristics and further development have advanced as described in the paper "HIKARIZOFUKUKI TO SONO OYO" (Ohm Corp. published May 30, 1992, pp. 99 to 123).

An erbium-doped optical fiber amplifier (EDFA) is an amplifier that utilizes an optical fiber with a glass fiber core doped with erbium ion ($Er^{+3}$) (erbium-doped fiber). Pumping light forms an inverted population inside the EDF. When an optical signal is input as an optical input into an EDF having formed therein an inverted population, emissions occur inside the EDF amplifying these optical signals. The amplified optical signals are then output as an optical output.

FIG. 1 shows characteristics of the wavelengths and optical output power of an EDFA. In FIG. 1, the wavelength is shown in the horizontal axis (units: nm) and the optical output power is shown in the vertical axis (units: dBm) FIG. 1 shows output characteristics when optical signals of eight different wavelengths each having an optical power of −26 [dBm/ch] are simultaneously input into an EDFA as optical inputs and then amplified. From the output characteristic data shown in FIG. 1, it is understood that there is a difference in the optical output power for each wavelength. In other words, within the plurality of wavelengths there is a wavelength dependency output power deviation ΔG in the output between the maximum optical output power and the minimum optical output power. This deviation ΔG is an output (or gain) deviation.

When this EDFA is provided in multistages in a transmission system having a long span as optical amplifier repeater, the output power deviation ΔG accumulates sequentially. Because of this, that wavelength causes the optical output signal to experience S/N degradation, and in a worst case scenario, signal loss.

Further, the wavelength dependency output power deviation of a conventional EDFA changes in response to the input state. FIG. 2 shows the relation between the wavelengths of an obtained optical output signal and optical output power when the optical input power changes to seven paths and is input into an EDFA for optical signals having eight different wavelengths. The wavelength is shown in the horizontal axis (units: nm) and the optical output power is shown in the vertical axis (units: dBm). Characteristic curves A, B, C, D, E, F and G correspond to and optical input power of −12, −14, −16, −18, −20, −22 and −24 (units: dBm/ch), respectively. As can be understood from the results shown in FIG. 2, the output deviations occurring in the optical output power of the EDFA differ in response to changes in the optical input power. For example, according to the results shown in FIG. 2, the optical output power close to 1532 nm is approximately 8 dBm and the output deviations of the optical output power are small for the input. However, if the wavelength expands to the 1544 nm side, the optical output power becomes smaller and is at its minimum close to 1540 nm. Then, the output deviation of the optical output power for the signal close to 1540 nm changes approximately 4 dB with respect to changes in the input power. This means that the slope of the spectrum of the optical output signal during batch amplification of multiple waveforms changes in response to changes in the input power.

Conventionally, the following two methods have been proposed as methods to reduce (compensate) the wavelength dependency output power deviation of an EDFA and flatten the output power.

The first method is a method wherein a gain equalizer comprising an interference filter and/or a fiber grating is inserted on the output side in a first stage EDFA or within or on the output side in a second or additional stage EDFA. This method cancels output deviations of EDFAs by means of providing the gain equalizer with characteristics opposite to the output characteristics which are wavelength dependent.

The second method is a method wherein improvements are made to the amplifier medium itself. For example, in this method the amplifier medium itself makes the output power flatten by adding phosphorus (P) to an EDF to create a hybrid EDF.

However, the first method that uses the above-mentioned gain equalizer has the following problems. At first, it is difficult to design a gain equalizer that has characteristics opposite to an EDFA. Next, in reality a gain equalizer only corresponds to a wavelength dependency output power deviation of one certain optical input power. In other words, it is not possible to use a gain equalizer to flatten the optical output power of a wavelength division multiplexing signal output from an optical fiber amplifier extending over the entire input power range and input wavelength region of a wavelength division multiplexing signal input to an optical fiber amplifier. For attaining the reduction of a wavelength dependency output power deviation over the entire input power range and input wavelength region by means of the first method, it would probably be necessary to use an active gain equalizer (optical component) with gain equalizing characteristics which depend on the optical input power. For example, the necessity of a movable portion to change the incident angle of the optical signal directed towards a filter for each power or the necessity of optical components to change the angle of the filter in response to an input signal make it difficult to practically use the first method reliably and with control.

The second method that utilizes an amplifier medium has the following problems. When this method is used, it is difficult to design the amplifier medium. Namely, the wavelength range in which the amplifier medium can handle amplification processing is limited. Therefore, it is difficult to provide a composition of an amplifier medium to achieve gain flattening of optical power of an optical output signal extending over a wide wavelength range. Further, the above-mentioned wavelength dependency output power deviation is dependent on the optical input power as previously described referring to FIG. 2 for the hybrid EDF doped with phosphorus (P) and another amplifier medium. Because of this, the optical input power does not allow flattening of the optical output power. In other words, uniform gain cannot be achieved.

Thereupon, the inventors of this application carried out various research and experiments to solve the above-mentioned problems. As a result, the inventors were aiming at an EDFA with amplification characteristics of optical power which were dependent on the wavelength in addition to absorption characteristics of optical power which were dependent on the wavelength as well. The inventors considered that if amplification optical fibers which actuate by amplification characteristics and absorption optical fibers which actuate by absorption characteristics were connected in series together within one transmission path as well as absorption optical fibers having absorption characteristics which allow compensation of amplification characteristics, it would be possible to equalize (flatten) the gain, namely the optical power, of each optical multiplexed output signal from the amplification optical fibers.

SUMMARY OF THE INVENTION

The object of the present invention is to provide optical fiber amplifiers which can flatten the gain of optical output signals, namely optical power, with respect to optical input signals extending over a wide wavelength range and a wide optical input power range as well as efficiently flattening the optical power.

According to a first aspect of the present invention, optical fiber amplifiers are provided which use optical fibers to amplify optical signals which enter the amplifiers from an input port and are emitted from output port. The optical fiber amplifiers include main optical amplifiers and first gain equalizers connected to the main optical amplifiers between the input port and the output port. The main optical amplifiers comprise first optical fibers which amplify the optical signals, a first pumping light supply means which supplies a first pumping light to excite the first optical fiber, and a non-reciprocal means which controls the reflection of light on the input port and the output port. The first gain equalizers comprise a second optical fiber for flattening the gain of the power of the optical signal to be emitted from the output port within a fixed wavelength range.

According to this composition, a second optical fiber that absorbs the optical power of optical signals is provided in addition to the first optical fibers which amplify the optical power of optical signals. Deviations in the optical power of optical output signals amplified by the first optical fibers, namely, wavelength dependency of output deviations (referred to as amplification output deviations) can be measured and discovered in advance. Further, deviations in the optical power of optical output signals absorbed by the second optical fibers, namely, wavelength dependency of output deviations (referred to as absorption output deviations) can also be measured and discovered in advance. Therefore, the first optical fibers and the second optical fiber that transfers absorption output deviations which can provide optimal compensation of the amplification output deviations are used in combination. When used in combination in this manner, the second optical fiber equalizes the gain of the output power of the main optical amplifiers during operation of the optical fiber amplifiers, in other words, the second optical fiber operates as a gain equalizer that flattens the output power. Because of this, it becomes possible to flatten the output power from the optical fiber amplifiers. Moreover, the first gain equalizer can be disposed in front of or in back of the main optical amplifiers.

According to the present invention, gain flattening uses the wavelength dependency of absorption characteristics of the second optical fiber to compensate for wavelength dependency output power deviations based on amplification characteristics of the first optical fiber.

In addition, the above-mentioned non-reciprocal means can be a means that combines a function to cut out pumping light or can be added thereto a separate means that cuts out pumping light as necessary.

According to a preferred embodiment of the present invention, the second optical fiber can be provided with a wavelength dependency of the absorption characteristics opposite to the amplification characteristics of the first optical fiber within a fixed wavelength range. According to this composition, gain flattening can be efficiently achieved.

According to another preferred embodiment of the present invention, a stimulated emission cross-sectional surface area of a first equivalent optical fiber may be identical to the reverse of a light absorption cross-sectional surface area of a second equivalent optical fiber when it is assumed that the first optical fiber is replaced by the first equivalent optical fiber and the second optical fiber is replaced by the second equivalent optical fiber. According to this composition, without regard to the number of main optical amplifier and first gain equalizer stages provided in the transmission path, it is possible to match the amplification characteristics of all provided main optical amplifiers with the absorption characteristics of all provided gain equalizers in such a manner to cancel each other. This makes it possible to achieve flattening of the output power from the optical fiber amplifiers.

According to another preferred embodiment of the present invention, it is preferable for the first and second optical fibers to be cut from one optical fiber produced under identical manufacturing conditions. In this manner, the wavelength dependency amplification characteristics and the wavelength dependency absorption characteristics of the first and second optical fibers are almost identical. This makes it possible to achieve efficient gain flattening, namely, flattening of the output power.

According to another preferred embodiment of the present invention, a non-reciprocal means can comprise first isolators connected between the input port and the first optical fiber and second isolators connected between the first optical fiber and the output port. The non-reciprocal means may comprise a means that cuts out pumping light as necessary, for example, adding a filter. According to this composition, the reflection of light from the input port and the output port can be controlled in addition to allowing pumping light to be cut out as necessary.

According to a preferred embodiment of the present invention, it is preferable to provide a second pumping light supply means that supplies a second pumping light to excite the second optical fiber and change the wavelength dependency of the absorption characteristics of the fiber to characteristics different from the wavelength dependency of the absorption characteristics during a non-pumping state. The adjusting of the wavelength dependency of the absorption characteristics of the second optical fiber will make it possible to achieve efficient flattening of the output power.

Furthermore, according to an embodiment of the present invention, it is preferable to provide a detection means that detects the power of the optical signal, and a pumping light control circuit that controls the power of the second pumping light from the second pumping light supply means based upon the detected power from the detection means. According to this composition, for example, the optical input signal or changes over time of the output power of the first optical fiber are allowed to track making it possible to achieve gain flattening of the output power with even more efficiency.

In this embodiment of the present invention, it is preferable to provide a prevention means that prevents the first pumping light from the first pumping light supply means from entering the second optical fiber. According to this composition, during the operation of the optical fiber amplifiers fluctuations in the wavelength dependency absorption characteristics caused by the first pumping light of the second optical fiber can be controlled. Therefore, the wavelength dependency absorption characteristics of the second optical fiber due to the signal of the first optical fiber can be utilized.

In this embodiment of the present invention, it is preferable for the first pumping light supply means to have a first optical means, for example, a first WDM (Wavelength Division Multiplexing Signal) coupler and a first pumping light source that generates the first pumping light. The first optical means can be connected to the input port, the first pumping light source and the first optical fiber, and the optical signal and the first pumping light can be optically multiplexed passing through to the first optical fiber.

Further, the first optical means is connected to the output port, the first pumping light source and the first optical fiber with the optical signal passing through to the output port side and the first pumping light passing through towards the first optical fiber.

In this embodiment of the present invention, it is preferable for the first gain equalizers to be connected between the main optical amplifiers and the output port and even further, to provide a second gain equalizer between the first gain equalizers and the output port. According to this composition, a wavelength range and/or power range with an insufficient amount of output flattening by the first gain equalizers can be compensated by using the second gain equalizer.

The second gain equalizer need not be a movable portion and can be an interference filter, a fiber grating an etalon filter or a Mach-Zehnder type filter.

In this embodiment of the present invention, it is preferable for the second pumping light supply means to have a second optical means, for example, a second WDM (Wavelength Division Multiplexing Signal) coupler and a second pumping source that generates the second pumping light. The second optical means passes an optical signal towards the second optical fiber or an optical signal from the second optical fiber in addition to passing the second pumping light towards the second optical fiber.

According to a second aspect of the present invention, optical fiber amplifiers include first and second main optical amplifiers and first gain equalizers connected to the first and second main optical amplifiers between the input port and the output port. The first and second main optical amplifiers comprise first optical fibers which amplify the optical signals, a first pumping light supply means which supplies a first pumping light to excite the first optical fiber, and a non-reciprocal means which controls the reflection of light on the input port and the output port. The first gain equalizers comprise a second optical fiber for flattening the gain of the power of the optical signal to be emitted from the output port within a fixed wavelength range. According to this composition, flattening of the output gain of the first and second main optical amplifiers can be achieved by the first gain equalizers. For this case, a function can be provided in the non-reciprocal means itself that cuts out pumping light. Alternatively, in addition to the above-mentioned non-reciprocal means, a separate means that cuts out pumping light may be provided as necessary.

According to a third aspect of the present invention, a method is provided that uses optical fiber amplifiers to amplify a wavelength division multiplexing signal that enters from an input port and is emitted from an output port to flatten the power of the wavelength division multiplexing signal to be emitted.

This flattening method comprises first and second optical fibers connected in series to the optical fiber amplifier. The first optical fiber is actuated by wavelength dependency amplification characteristics. The second optical fiber is actuated by wavelength dependency absorption characteristics. And, a wavelength division multiplexing signal input to the first optical fiber undergoes batch amplification from the first optical fiber and then the power of the wavelength division multiplexing signal is flattened using wavelength dependency absorption characteristics of the second optical fiber.

According to this composition, investigations were carried out in advance by means of experimentation on wavelength dependency amplification characteristics of the first optical fiber and wavelength dependency absorption characteristics of the second optical fiber with characteristics opposite to the first optical fiber. Then, gain of the optical signal to be emitted from the output port could be flattened in a fixed wavelength region of the wavelength division multiplexing signal that enters the input port and within a fixed power region using the second optical fiber to compensate for output deviations of the first optical fiber.

In a preferred embodiment of the method of the present invention, a wavelength division multiplexing signal output from the second optical fiber passes through the first optical fiber is sent to the output port.

In another preferred embodiment of the method of the present invention, a wavelength division multiplexing signal that enters from the input port passes through the first optical fiber is sent to the second optical fiber.

In this embodiment of the method of the present invention, it is preferable for the wavelength division multiplexing signal to pass through the second optical fiber while the second optical fiber is in a non-pumping state or in the absorption region.

Furthermore, in this embodiment of the method of the present invention, it is preferable for the wavelength division multiplexing signal to pass through the second optical fiber while the second optical fiber is in an pumping state within a range in which an optical signal is not amplified. Or, the composition can be such that the pumping state of the second optical fiber changes in response to the state of the power of the wavelength division multiplexing signal.

Thus, by means of exciting the second optical fiber or making it possible to adjust that pumping state within a range in which an optical signal is not amplified, the gain of the output power can be flattened with even more accuracy.

BRIEF DESCRIPTION OF THE DRAWINGS

The foregoing and other objects, features and advantages of the present invention will be better understood from the following description taken in connection with the accompanying drawings.

DESCRIPTION OF THE PREFERRED EMBODIMENTS

In the following, preferred embodiments of the optical fiber amplifiers and the flattening method of the output power of the optical fiber amplifiers will be described with reference to the attached drawings. In the embodiments described below, EDFA represents the optical fiber amplifiers and EDF represents optical fibers having wavelength absorption characteristics.

Further, the embodiments described below are simple preferred embodiments. The inventors want to make clear that the present invention is not limited to these embodiments.

At first, before describing each embodiment, the EDFA and absorption EDF used by the present invention will be described.

Figure 3A:
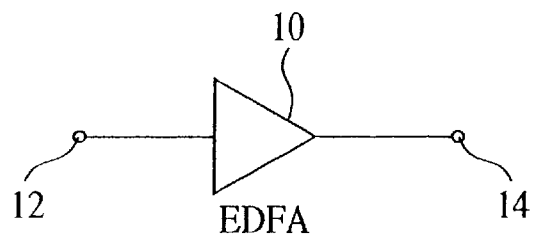
FIG. 3 (including FIG. 3(A) to (D)) are block diagrams which provide explanations of the composition of a conventional optical fiber amplifier and an optical fiber amplifier of the present invention.
Figure 3B:
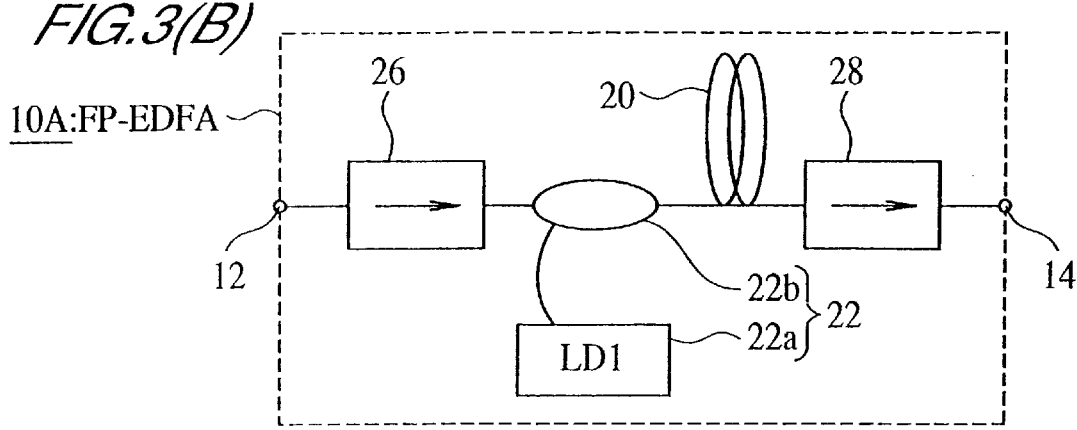
Figure 3C:
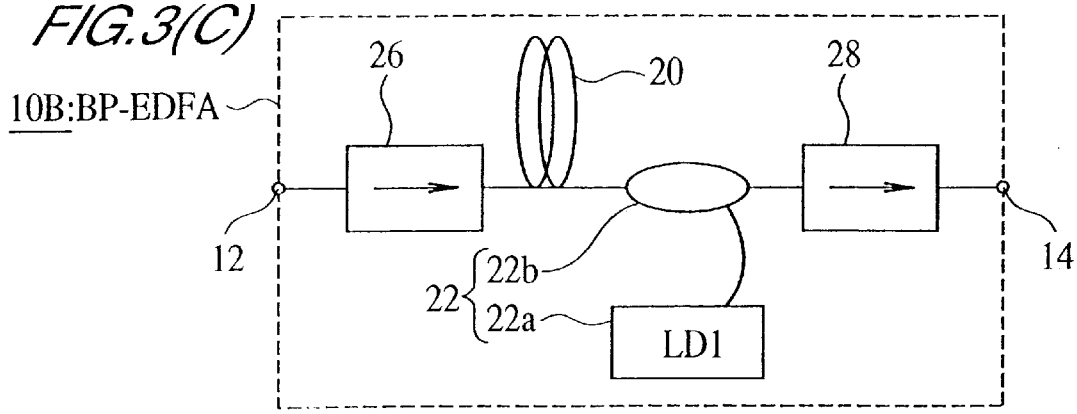
Figure 3D:
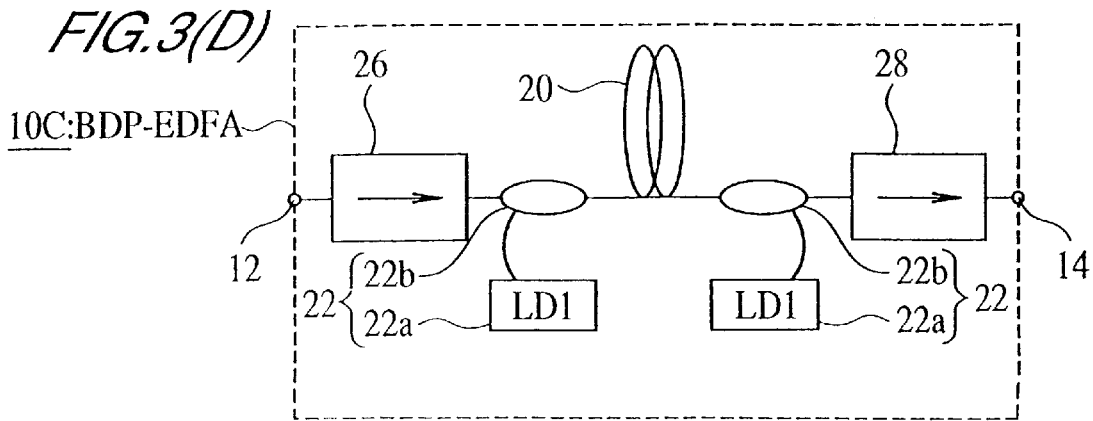

FIG. 3(A) is EDFA 10 indicated by symbols. In the figure, 12 and 14 are an input port and an output port, respectively, whereto EDFA 10 is connected. FIG. 3(B) to (D) shows concrete examples of the composition of EDFA 10. Normally, EDFA 10 comprises an optical fiber (here EDF 20) that amplifies an optical signal that enters from input port 12, one or two pumping light supply means 22 which supply an pumping light to excite optical fiber 20, and non-reciprocal means 26, 28 which control the reflection of light on input port 12 and output port 14. Pumping light supply means 22 has a pumping light source (LD1) 22a such as a semiconductor laser, a first optical means 22b that multiplexes an optical signal and pumping light sending them to optical fiber 20 and/or passing an optical signal from optical fiber 20 to output port 14 together with passing pumping light to optical fiber 20. First optical means 22b can be, for example, a first WDM coupler or a first polarization beamsplitter. In this embodiment first WDM coupler 22b is shown by example.

FIG. 3(B) is a block diagram showing an example of a composition of a forward pumping or co-propagation pumping type EDFA 10A (FP type). This composition example comprises a first isolator comprising, for example, non-reciprocal means 26 that is connected to input port 12, first WDM coupler 22b that is connected to first isolator 26, amplification optical fiber 20 (hereinafter this optical fiber is referred to as first optical fiber or first EDF) that is connected to the first WDM coupler, and a second isolator comprising, for example, non-reciprocal means 28 that is connected between first optical fiber 20 and output port 14. The optical signals and pumping light in EDFA 10A in this composition example have matching travel directions.

FIG. 3(C) is a block diagram showing an example of a composition of a backward pumping or counter-propagation pumping type EDFA 10B (BP type). In the above-mentioned composition example of FIG. 3(B), pumping light supply means 22 is connected between first isolator 26 and first optical fiber 20. However, in the composition example of FIG. 3(C), the fact that pumping light supply means 22 is connected between first optical fiber 20 and second isolator 28 differs from the composition example of FIG. 3(B). The optical signals and pumping light in EDFA 10B in this composition example have travel directions opposite to each other.

FIG. 3(D) is a block diagram showing an example of a composition of a backward pumping or counter-propagation pumping type EDFA 10C (BDP type). In this composition example, an pumping method is used that combines the pumping methods of FIG. 3(B) and FIG. 3(C).

When a wavelength division multiplexing signal is input into any of the above-mentioned EDFA 10A, 10B, and 10C, the optical power of these signals is simultaneously amplified together and output as an amplified wavelength division multiplexing signal. In other words, the pumping light emitted from pumping light source 22a passes through first WDM coupler 22b and then each light is absorbed by first optical fiber 20 causing a sufficient inverted population inside this first optical fiber 20. In a state in which this pumping light is entering into first optical fiber 20, the optical input, namely, the optical signal enters this first optical fiber 20. The optical signal is amplified in order following the propagation within first optical fiber 20 due to a stimulated emission action. This amplified optical signal passes through second isolator 28 and is externally discharged or emitted from output port 14 to EDFA 10A, 10B, and 10C as an optical emission signal or an optical output. Further, the connection order of first isolator 26 and pumping light supply means 22 in FIG. 3(B) and (D) can be switched between input port 12 and first optical fiber 20.

Figure 1:
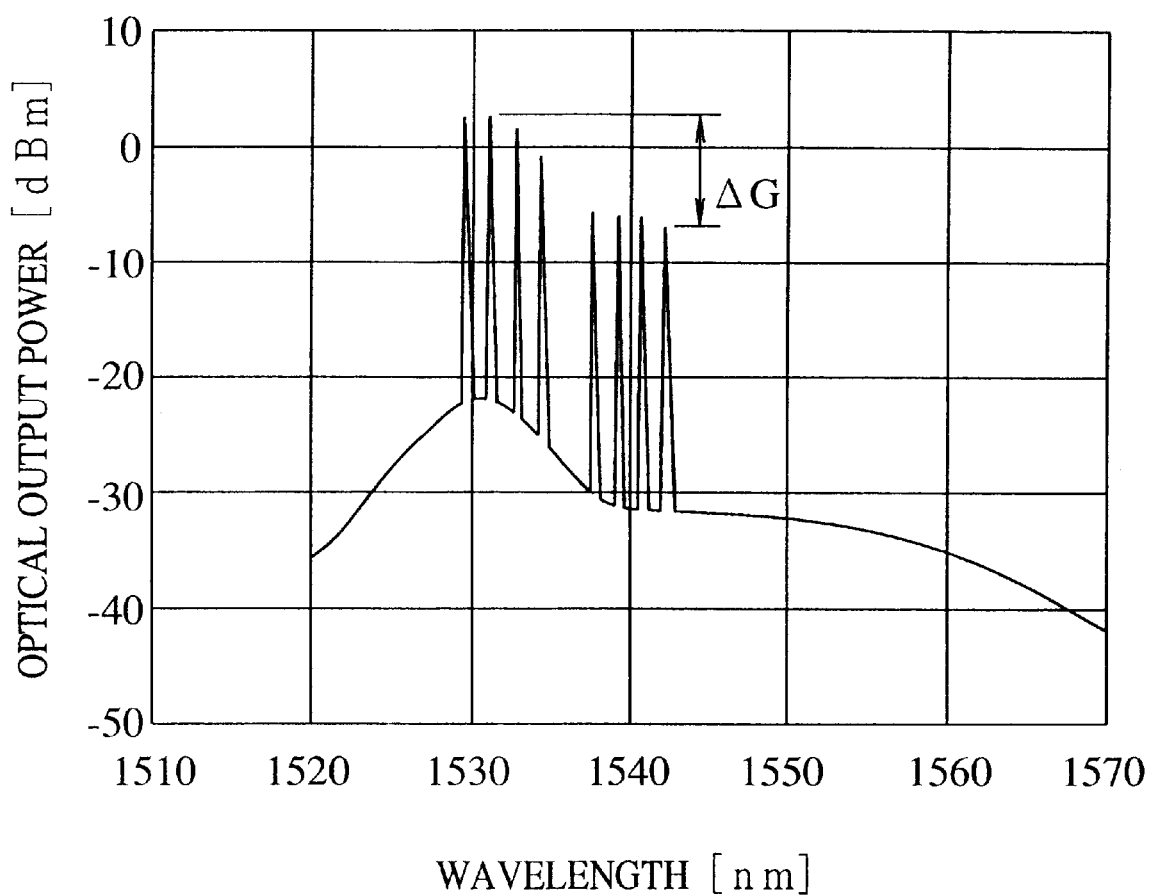
FIG. 1 provides an explanation of a conventional optical fiber amplifier and an optical fiber amplifier of the present invention. This figure shows a wavelength dependency output power deviation of an EDFA.

As already described in FIG. 1, the amplification characteristics of the optical output discharged from output port 14 are dependent on the wavelength. These amplification characteristics are called a wavelength dependency amplification characteristic below. As already described in FIG. 2, this wavelength dependency amplification characteristic changes due to optical input power.

Figure 4:
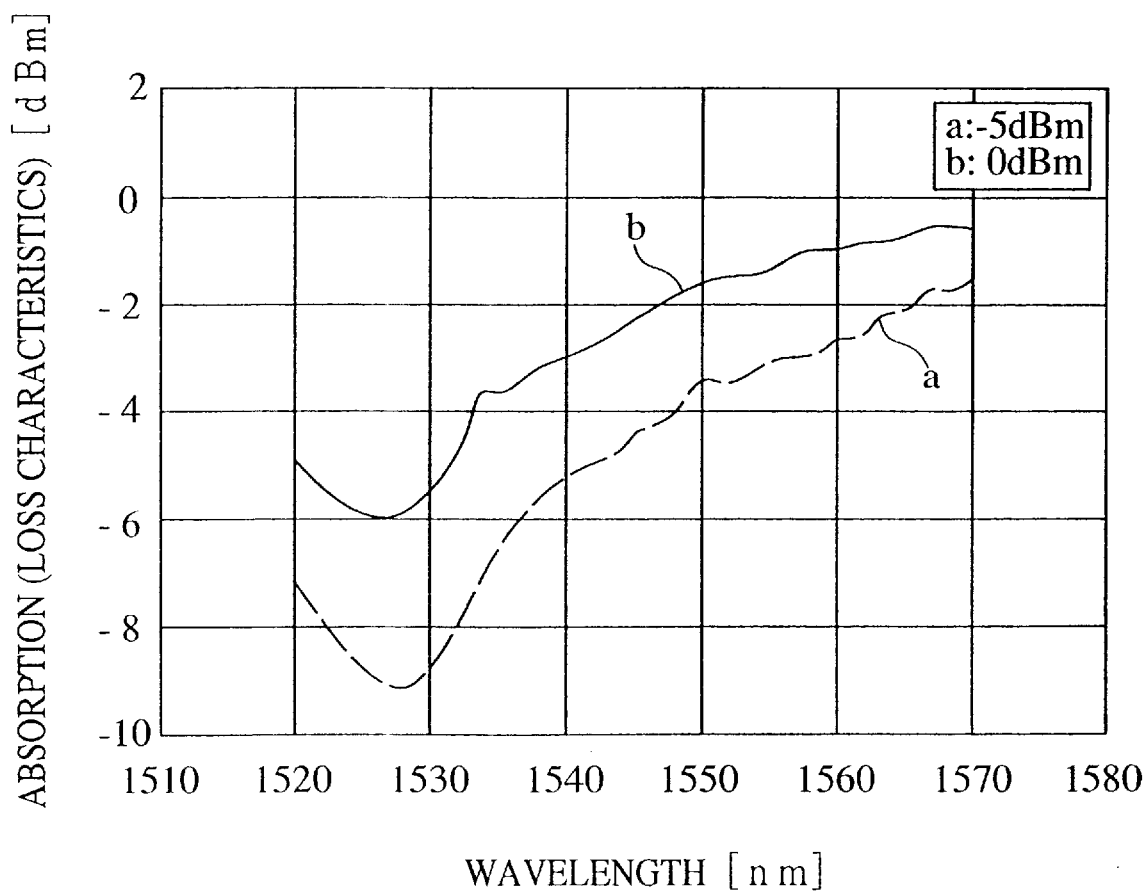
FIG. 4 provides an explanation of an optical fiber amplifier of the present invention. This figure shows an input dependency of the absorption characteristics of a secondary fiber (namely, an absorption EDF)

A non-pumping EDF exhibits absorption characteristics. FIG. 4 shows absorption characteristic curves to describe absorption characteristics of a non-pumping EDF. These absorption characteristics are a result obtained from measurements of the power of incident light reflecting incident to the EDF and the power of the optical output from the EDF in a state in which the EDF is not excited. The wavelength is shown in the horizontal axis (units: nm) and the absorption (loss characteristics) is shown in the vertical axis (units: dBm). Curve a indicated by the broken line is shown with an optical input power of −5 dBm and curve b indicated by the solid line is shown with an optical input power of 0 dBm. As is clear from either of the characteristic curves a and b, the absorption characteristics for a non-pumping EDF has an increasing absorption from a wavelength close to 1502 nm with a maximum absorption close to 1530 nm. Thereafter, following the increasing wavelength, the absorption can be said to be monotonous making it possible to understand the changes. In other words, the non-pumping EDF exhibits absorption characteristics due to loss of the EDF itself namely, dampening characteristics. The wavelength characteristics of this absorption or dampening is approximately opposite to the amplification characteristics of amplification EDF 20 described referring to FIG. 2 and FIG. 3 (in particular, refer to the wavelength range of 1530 to 1540 nm of FIG. 2 and FIG. 4). In addition, it can be understood that the absorption (dampening) characteristics change to active because of the optical power of the optical input from curves a and b to the non-pumping EDF.

Figure 2:
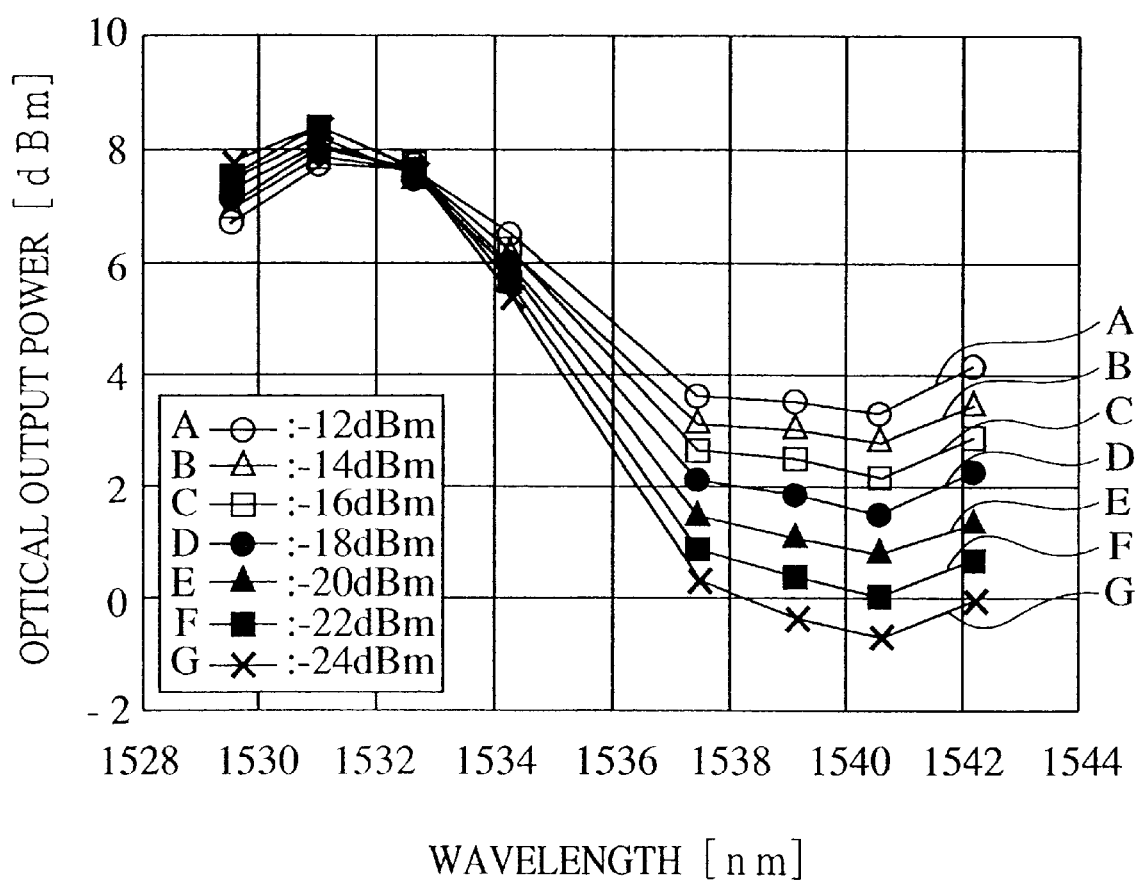
FIG. 2 provides an explanation of a conventional optical fiber amplifier and an optical fiber amplifier of the present invention. This figure shows optical input power dependency of a batch amplification of multiple waveforms of an EDFA.

From the description already provided for FIG. 2 and FIG. 4, it can be understood that if the amplification EDF and an EDF that exhibits these absorption characteristics are used jointly, the wavelength dependency output power deviation that changes due to the optical input power of the optical output amplified and output by the amplification EDF can be compensated to a considerable degree by the absorption characteristics of the EDF depending on the situation.

Hereinafter, based on these facts, a definite example of a composition of an optical fiber amplifier that combines an amplification EDF and an absorption EDF and is comprised to allow flattening of the gain of an optical output will be described. Further, in the following description, conventional EDFA 10 (10A, 10B, 10C) comprising the optical fiber amplifier of the present invention will be referred to the main optical amplifier. Even further, because the absorption EDF (newly added compositional element) flattens the gain of a wavelength division multiplexing signal to be output from an optical fiber amplifier, this absorption EDF will be referred to as a first gain equalizer here.

First Embodiment

Figure 5:
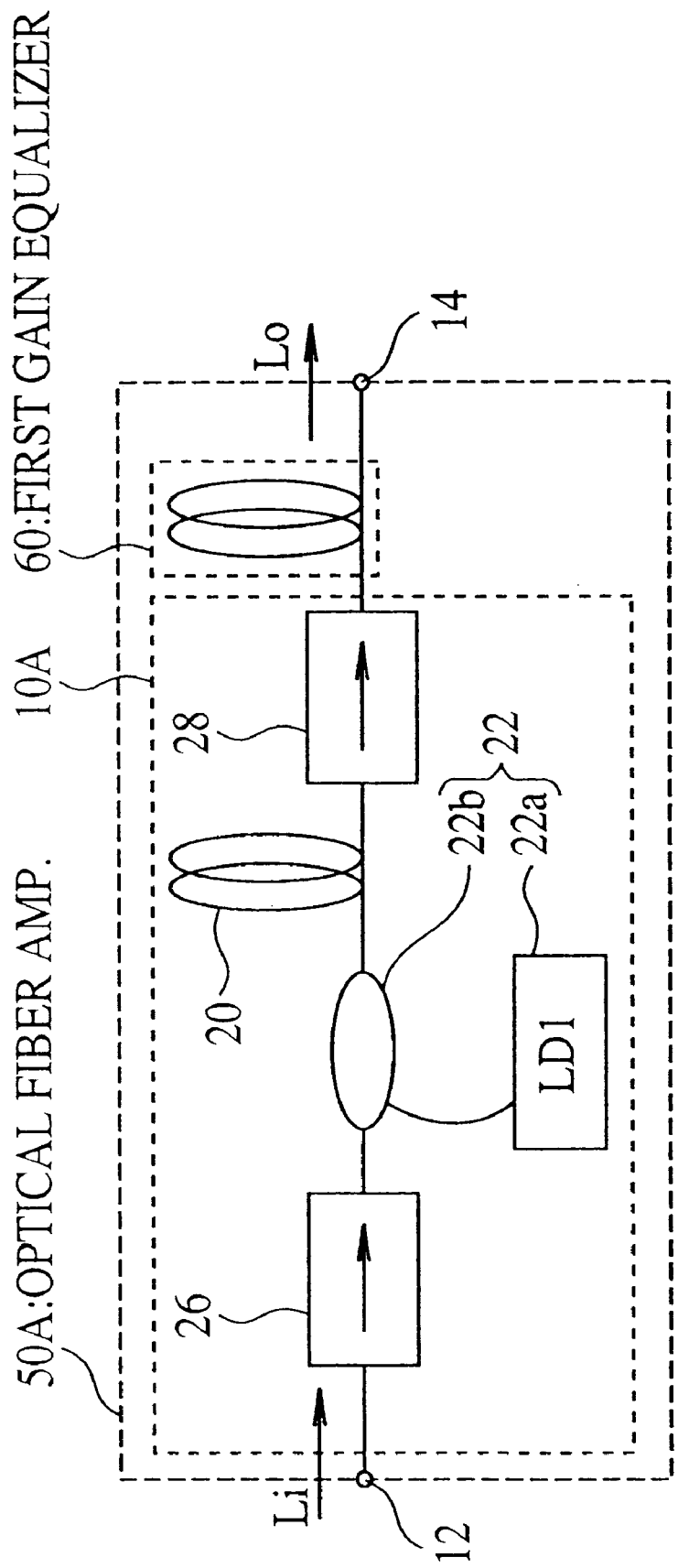
FIG. 5 is a block diagram that provides an explanation of the composition of the first embodiment of an optical fiber amplifier of the present invention.

FIG. 5 is a block diagram showing an example of the composition of optical fiber amplifier 50A of the present invention. This optical fiber amplifier 50A comprises an FP type EDFA 10A described referring to FIG. 3(B) as a main optical amplifier along with first gain equalizer 60 being connected between main optical amplifier 10A and output port 14. Therefore, each compositional element of main optical amplifier 10A in FIG. 5 is represented by reference symbols identical to FIG. 3(B). First pumping light supply means 22 has a composition to generate a first pumping light and then multiplex this pumping light with an optical signal. First pumping light supply means 22 is comprised by a semiconductor laser light source as first pumping light source 22a, and a WDM coupler as optical means 22b for multiplexing an optical signal with first pumping light. Using as first and second isolators 26 and 28 as a means with a wavelength selectivity that can prevent passage of first pumping light from first pumping light source 22a to the input port or the output port is preferable.

First gain equalizer 60 is comprised by a second optical fiber. In this composition example optical fiber amplifier 50A is operated by first optical fiber 20 being set to an excited state and second optical fiber 60 being set to a non-excited state.

The next description will discuss the absorption characteristics during a non-excited state of second optical fiber 60 (second EDF) incorporated in the optical fiber amplifier of the composition of this first embodiment becoming essentially opposite to the amplification characteristics during an excited state of the first optical fiber 20 (first EDF).

$L_i$ represents the optical signal entering from the input port and $L_0$ represents the optical signal emitting from the output port. Hereupon, the description will focus on the EDF used in first and second optical fibers 20 and 60. The optical power of wavelength λ of the optical signal entering into the EDF is Pin (λ), the gain of this wavelength λ is G (λ) and the optical power of the optical signal emitted from the EDF is Pout (λ). As described in the above-mentioned paper "HIKARIZOFUKUKI TO SONOOYO", for this case the following relations (1) to (3) are established.

$$\text{Pout}(\lambda) = \text{Pin}(\lambda) \cdot G(\lambda) \tag{1}$$

$$G(\lambda) = \int g(\lambda, z) dz \tag{2}$$

$$g(\lambda, z) = \Gamma[\sigma e(\lambda) \cdot N_2(z) - \sigma a(\lambda) \cdot N_1(z)] \tag{3}$$

The parameter g (λ, z) in expression (3) is a gain coefficient at a horizontal profile position of the EDF. Therefore, as shown in expression (2), gain G (λ) can be expressed by a value that integrates gain coefficient g (λ, z) located at different positions of each horizontal profile of the EDF with fiber length. Furthermore, Γ is a closed coefficient. In the EDF, σa (λ) is an absorption cross section that is an approximate indication of optical energy being absorbed (units: $m^2$ (square meters)). In the EDF, σe (λ) is an emission cross section that is an approximate indication of optical energy being emitted (units: $m^2$ (square meters)). These σa (λ) and σe (λ) are values fixed depending on the type of EDF. In the EDF, $N_1$ and $N_2$ are quantities which indicate a ratio of electrons located at a base level or a level higher than that in units (erbium: $Er^{+3}$) which absorb or discharge optical energy. Because of this, a value from 0 to 1 is used. The relationship between $N_1$ and $N_2$ is $N_1 + N_2 = 1$. No other relationship can be used.

Figure 6:
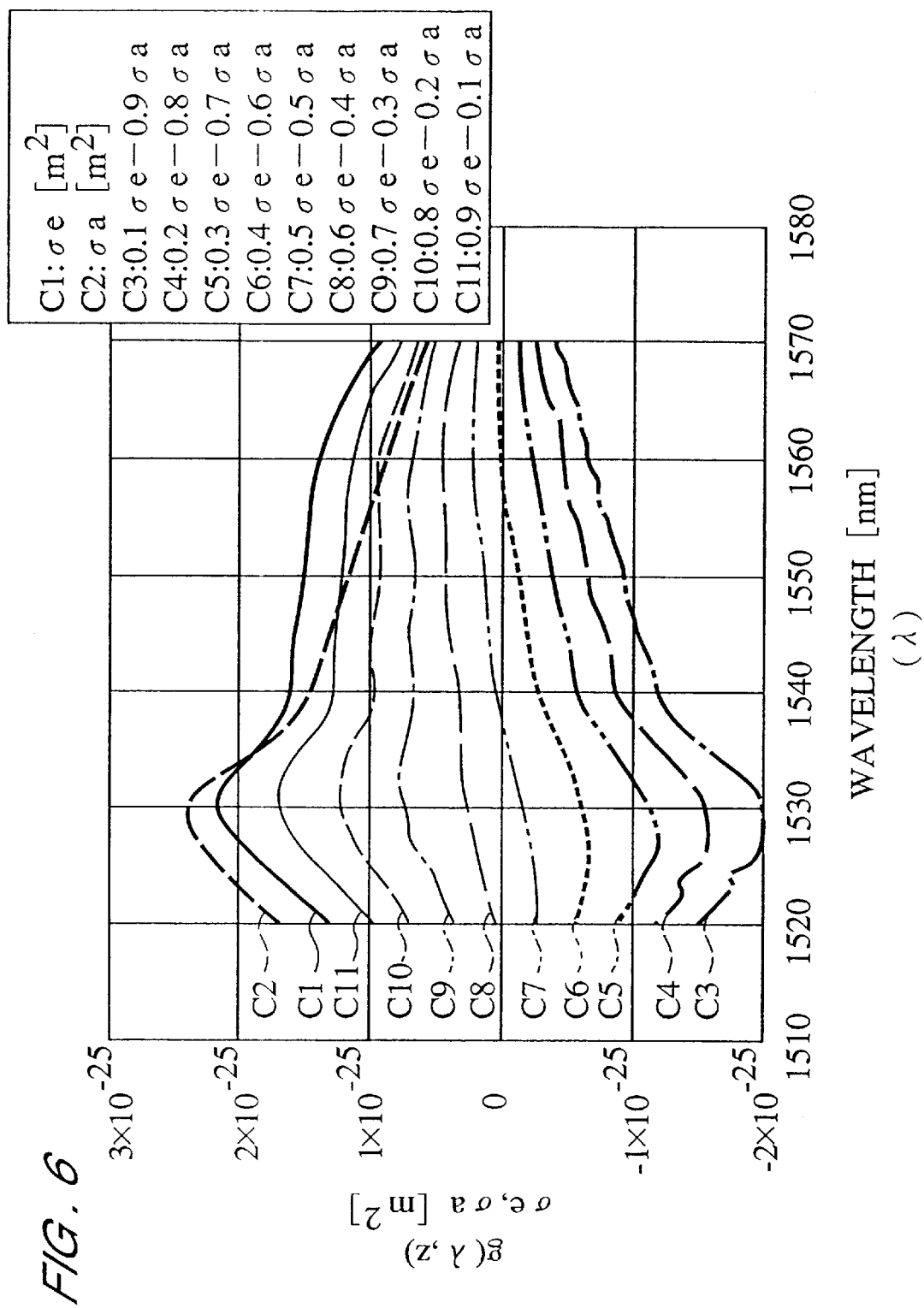
FIG. 6 shows characteristic curves which provides an explanation of an optical fiber amplifier of the present invention and which provide an explanation of amplification characteristics of an EDF to be used as a first optical fiber (EDF amplifier) and absorption characteristics of an EDF to be used as a second optical fiber (absorption EDF)

FIG. 6 shows a combination of N1 and N2 and the type of changes every gain coefficient g (λ, z), σa (λ) and σe (λ)

go through in response to the wavelength in an EDF used in the first and second optical fiber. The wavelength ($\lambda$) is shown in the horizontal axis (units: nm) and the gain coefficient g ($\lambda$, z), $\sigma$a ($\lambda$) and $\sigma$e ($\lambda$) are shown in the vertical axis (units: m²). A Cutback method was used to measure the EDF. As widely known, these measurement standards are standardized. This measurement was carried out in a wavelength range of 1502 nm to 1570 nm and resulted in obtaining C1 and C2. Calculations were determined from expression (3) for characteristic curve C3 to C11 (expression that corresponds to the one shown in FIG. 6). The relationship between each characteristic curve, $N_1$ and $N_2$, $\sigma$a ($\lambda$) and $\sigma$e ($\lambda$) are combined and shown in FIG. 6.

Looking at these curves, as an example, for curve C11, $N_1$ corresponds to 0.1 and $N_2$ corresponds to 0.9 and there are many upper level electrons. Because these electrons attempt to return to the ground state, the characteristics of curve C11 will correspond to the amplification operation of an EDF. For curve C11 the gain coefficient is at a maximum close to a wavelength of 1530 nm. The gain coefficient grows smaller as the wavelength moves towards 1502 nm and 1570 nm. The state of an EDF exhibiting characteristics of curve C11 can be explained by the fact that the EDF is almost equivalent to an entire inverted population state of an EDF in an excited state. In other words, the first optical fiber (first EDF), for example, whereinto pumping light is entering can be said to be in this state.

In contrast, for curve C3, $N_1$ corresponds to 0.9 and $N_2$ corresponds to 0.1 and there are many ground state electrons. Because these electrons absorb energy and attempt to rise to the upper level, the characteristics of curve C3 will correspond to the absorption operation of an EDF. For curve C3 the gain coefficient is at a minimum close to a wavelength of 1530 nm. The gain coefficient grows larger as the wavelength moves towards 1502 nm and 1570 nm. The state of an EDF exhibiting characteristics of curve C3 can be explained by the fact that the EDF is almost equivalent to a state of an EDF in a non-excited state. In other words, the second optical fiber (second EDF), for example, whereinto pumping light is not entering can be said to be in this state.

From these curves C11 and C3, it is understood that the wavelength dependency of gain coefficient g ($\lambda$, z) of first EDF 20 that carries out amplification processing and the wavelength dependency of gain coefficient g ($\lambda$, z) of second EDF 60 that carries out absorption processing are opposite.

For example, one of two EDFs having identical materials, identical lengths and identical compositions is applicable to first amplification EDF 20 and the other EDF is applicable to second absorption EDF 60. For this case, from the result of the measurement shown in FIG. 6, it is understood that the gain of the optical signal output from optical fiber amplifier 50A, namely, the optical power, can be flattened extending over a wide input wavelength range and a wide input power range.

When actually producing optical fiber amplifier 50A, two EDFs are cut from one EDF produced under identical manufacturing conditions. One of the EDFs is used as the first EDF and the other EDF is used as the second EDF. For this case, the length settings of the first and second EDFs 20 and 60 for the optical fiber amplifier shown in FIG. 6 take the following points into consideration, namely, determining the length such that the optical output power from optical fiber amplifier 50A is flattened with a fixed wavelength range. Alternatively, can be determined such that a maximum output can be obtained while achieving a desired degree of gain flattening. The lengths of the first and second EDFs 20 and 60 can be identical or the length of second EDF 60 can be adjusted in response to the amplification characteristics of first EDF 20.

For other curves shown in FIG. 6, for example, curves C8 to C10, the ratio of upper level electrons $N_2$ is large and the gain coefficient g ($\lambda$, z) is positive. Therefore, an EDF having characteristics which correspond to these types of curves has an amplification function. Further, for curves C4 to C6, the ratio of ground state (base level) electrons N1 is large and the gain coefficient g ($\lambda$, z) is negative. Therefore, an EDF having characteristics which correspond to these types of curves has an absorption function. In contrast, for curve C7, the ratio of upper level electrons $N_2$ is equal to the ratio of ground state electrons $N_1$, the gain coefficient g ($\lambda$, z) is close to zero (0) and the ratio of ground state electrons of the EDF is equivalent to a saturation state in which the amplification reaches a maximum limit.

From the description above, according to the present invention, an amplification EDF and an EDF which has characteristics opposite to the wavelength dependency of amplification characteristics of the amplification EDF are provided jointly in an optical fiber amplifier. It is understood that this composition makes it possible to reduce sudden growth of ASE (amplified spontaneous emissions) in a 1530 nm band (for example, 1502 nm to 1540 nm) which is the amplification characteristics of an ordinary EDFA. In other words, it is understood that by means of using EDFs with characteristics opposite to each other, it is possible to achieve gain flattening extending over a wide wavelength range. Even further, because the absorption characteristics of an absorption EDF to reduce output deviations in response to variations in the optical output power amplified and output from an amplification EDF, it is understood that it is possible to achieve gain flattening extending over a wide optical input power range.

According to EDFA 50A in the first embodiment, by means of providing a simple composition wherein non-pumping second EDF 60 is disposed in the output stage as first gain equalizer, the optical output power of this EDFA 50A can be easily flattened extending over a wide wavelength range and a wide optical input power range.

As already described, because output deviations between wavelengths from an amplification EDF are reduced extending over a wide wavelength range and a wide optical input power range, it was necessary for a conventional optical fiber amplifier to have a movable portion, a gain equalizing filter with a complex composition, or an amplification medium with a complex composition. In contrast to this, in the compositional example of the optical fiber amplifier of the present invention shown in FIG. 6, it is possible to easily reduce output or gain deviations between wavelengths by only linking a non-pumping EDF at the output stage. In this manner, the optical fiber amplifier of the present invention does not require excess control mechanisms thereby simplifying the composition and lowering the cost as well as making it possible to very effectively reduce output or gain deviations.

Moreover, because wavelength dependency output deviations decrease for an EDFA with a one stage composition, conventionally, an optical filter (loss having only wavelength dependency) was inserted into an EDFA. However, according to a conventional method, the output from an EDFA was the same as before inserting this optical filter or was reduced by only fundamentally reducing increases in the ASE output in the 1530 nm band. In contrast to this, according to the optical fiber amplifier of the first embodiment of the present invention, there is more increase in the optical output power (optical signal) close to 1550 nm to 1560 nm for an EDFA with a one stage composition compared to before an output deviation reduction means (second EDF 60) is provided. Compared to a conventional reduction method, reductions in the optical output power of the 1530 nm band and improvements (increase) in the optical output power of the 1550 nm band contribute to an increased transmission capacity and a longer span of transmission loss compensation along with higher outputs EDFA 50.

Next, results of comparative experiments between the conventionally composed EDFA of FIG. 3(B) and the EDFA with the composition of the first embodiment of the present invention of FIG. 6 will be described.

Figure 7A:
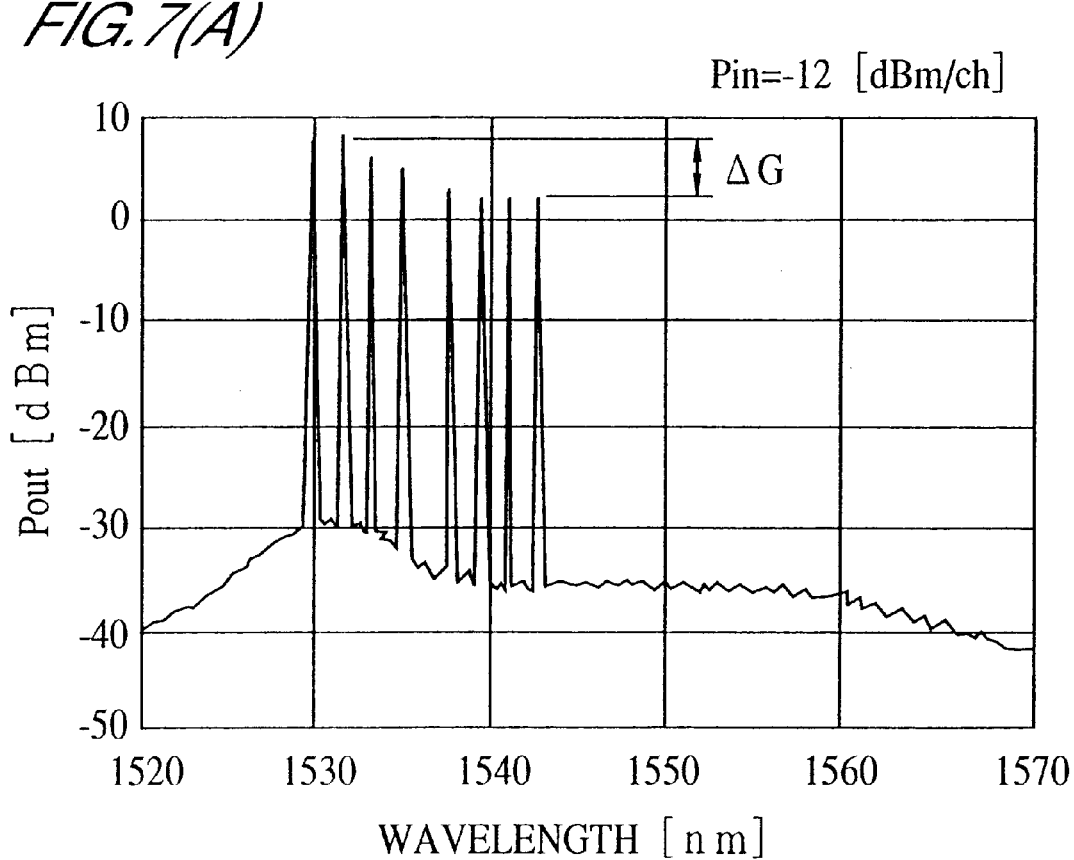
FIG. 7 (including FIGS. 7(A) and 7(B) show characteristic curves of the wavelength dependency of optical output power for explaining a conventional EDFA (FIG. 7C) (A)) and EDFA of the first embodiment of the present invention.
Figure 7B:
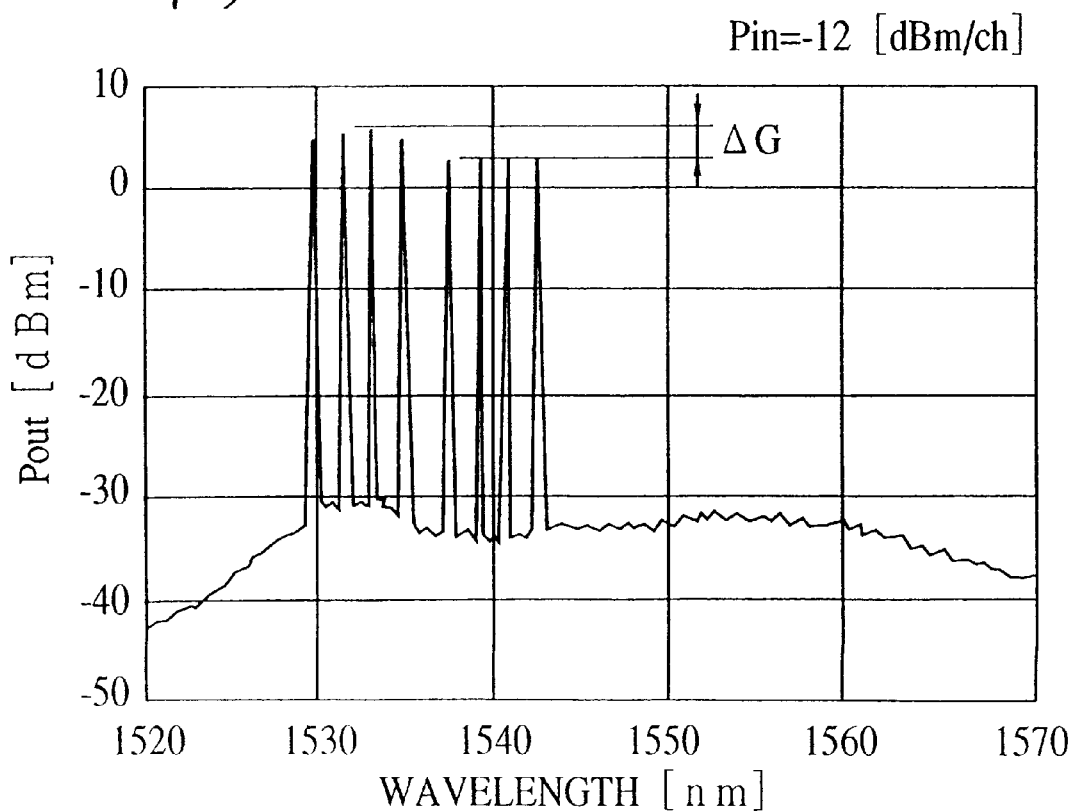

FIG. 7 (A) shows wavelength dependency of the optical output power of a conventional EDFA 10A and FIG. 7(B) shows characteristic curves of the wavelength dependency of optical output power of EDFA 50A of the first embodiment including gain flattening EDF 60. Either of these figures show the results when a wavelength division multiplexing signal of 8 waves each of which are −12 [dBm/ch] are input at an optical input power Pin. In each figure the wavelength is shown in the horizontal axis (units: nm) and the optical output power Pout is shown in the vertical axis (units: dBm).

From FIG. 7(A) and FIG. 7(B) it is understood that output deviation $\Delta G$ in the optical output of EDFA 50A is 3.33 [dBm] compared to deviation $\Delta G$ in the optical output of conventional EDFA 10A that is 5.82 [dBm]. Further, in contrast to the total optical output power of 8 waves for conventional EDFA 10A at 14.74 [dBm], the total optical output power of 8 waves for EDFA 50A was 13.54 [dBm]. From these facts it can be understood that by means of providing EDF 60, the power loss of EDFA 50A is remarkably reduced more than conventional EDFA 10A.

Figure 8A:
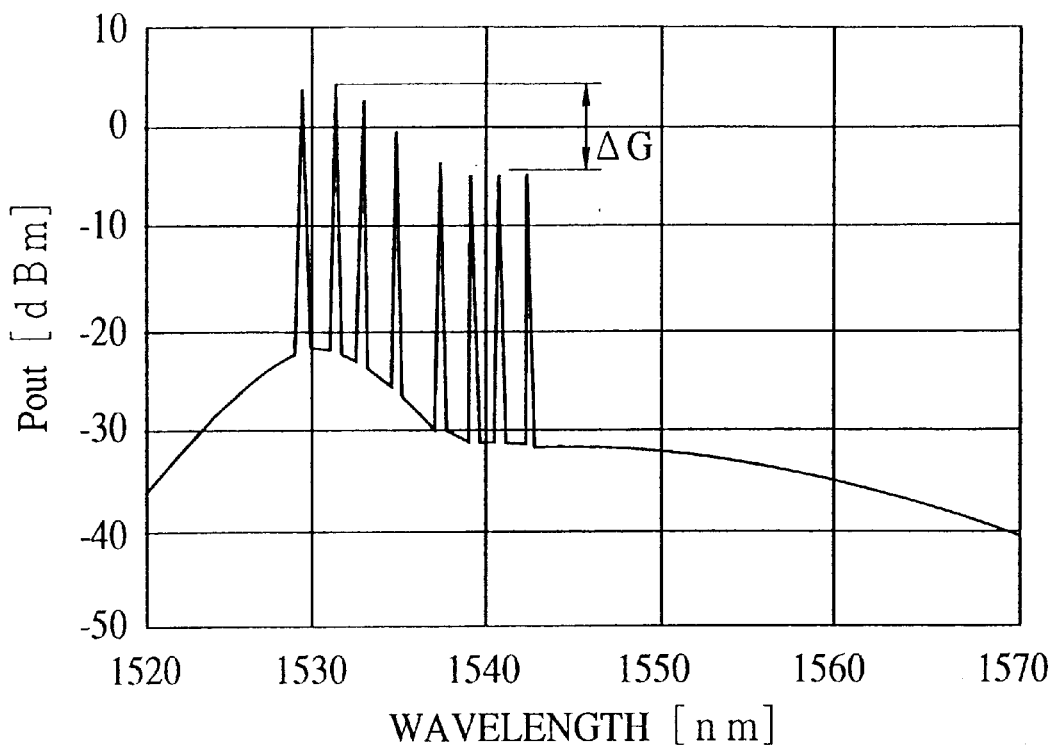
FIG. 8 (including FIGS. 8(A) and 8(B)) show other characteristic curves of the wavelength dependenty of optical output power for explaining the first embodiment of the present invention.
Figure 8B:
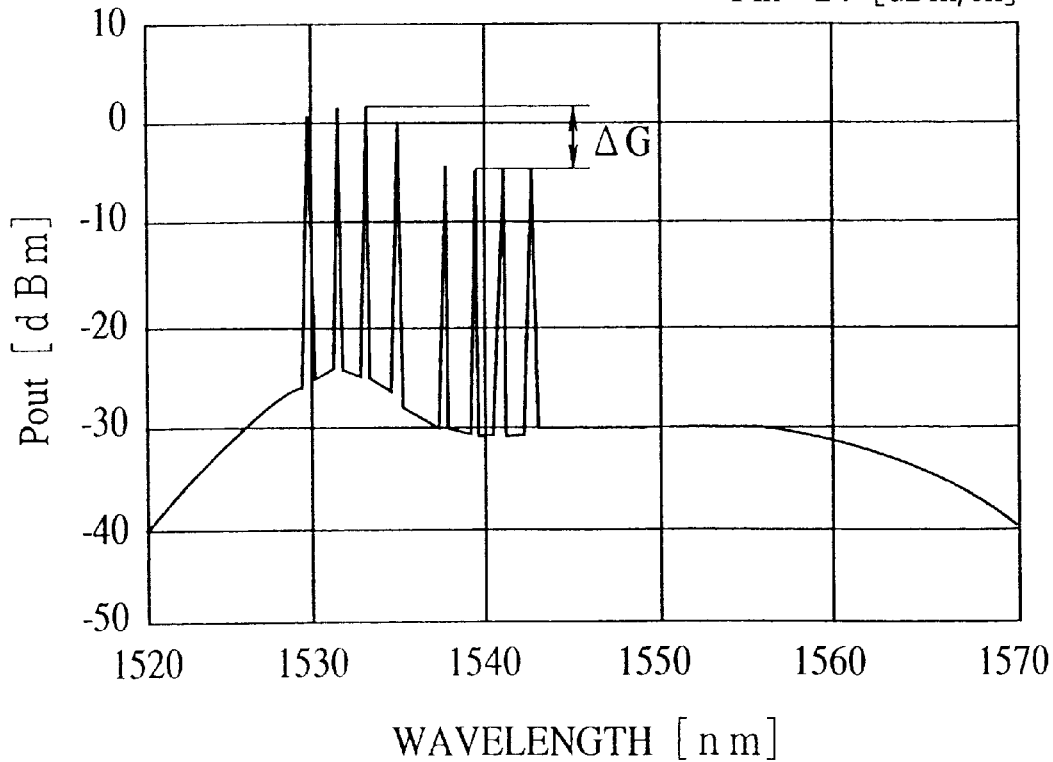

In like manner, FIG. 8(A) and FIG. 8(B) both show the results of optical output power Pout when a wavelength division multiplexing signal of 8 waves each of which are −24 [dBm/ch] are input at an optical input power Pin. In each figure the wavelength is shown in the horizontal axis (units: nm) and the optical output power Pout is shown in the vertical axis (units: dBm).

From FIG. 8(A) and FIG. 8(B) it is understood that output deviation $\Delta G$ in the optical output of EDFA 50A is 5.91 [dBm] compared to deviation $\Delta G$ in the optical output of conventional EDFA 10A that is 8.77 [dBm]. Further, in contrast to the total optical output power of 8 waves for conventional EDFA 10A at 10.17 [dBm], the total optical output power of 8 waves for EDFA 50A was 8.62 [dBm]. From these facts it can be understood that by means of providing EDF 60, the power loss of EDFA 50A is remarkably reduced more than conventional EDFA 10A.

Even further, focusing attention on an optical signal of 4 waves centered on 1540 nm, it is understood that even if −12 [dBm] and −24 [dBm] are present at the optical input power Pin, the optical output power of EDFA 50A will rise approximately 0.5 dB higher than conventional EDFA 10A by means of providing EDF 60. Moreover, in the above-mentioned experiments, since the gain of EDF 60 was not optimized, the optical output power dropped only marginally.

Next, referring to FIG. 9(A) to FIG. 9(D), the relationship between the optical input power Pin and the optical output power Pout, namely, experimental results on the dependence of the optical input power of the optical output power, will be described for EDFA 50A of the first embodiment of the present invention. In addition, in this experiment EDF 20 and 60 were used different from those used for the experiments on the wavelength dependence of the optical output power of FIG. 7 and FIG. 8. The measurements were carried out on 4 multiplexed signals and 4 groups of different wavelength ranges were used. In these FIGS. 9(A) −9(D), the optical input power Pin [dBm/ch] is shown in the horizontal axis, the optical output power Pout [dBm] is shown on the left side in the vertical axis and gain deviations (output deviations) $\Delta G$ [dB] is shown on the right side in the vertical axis. The measurements used an optical spectrum analyzer.

Figure 9A:
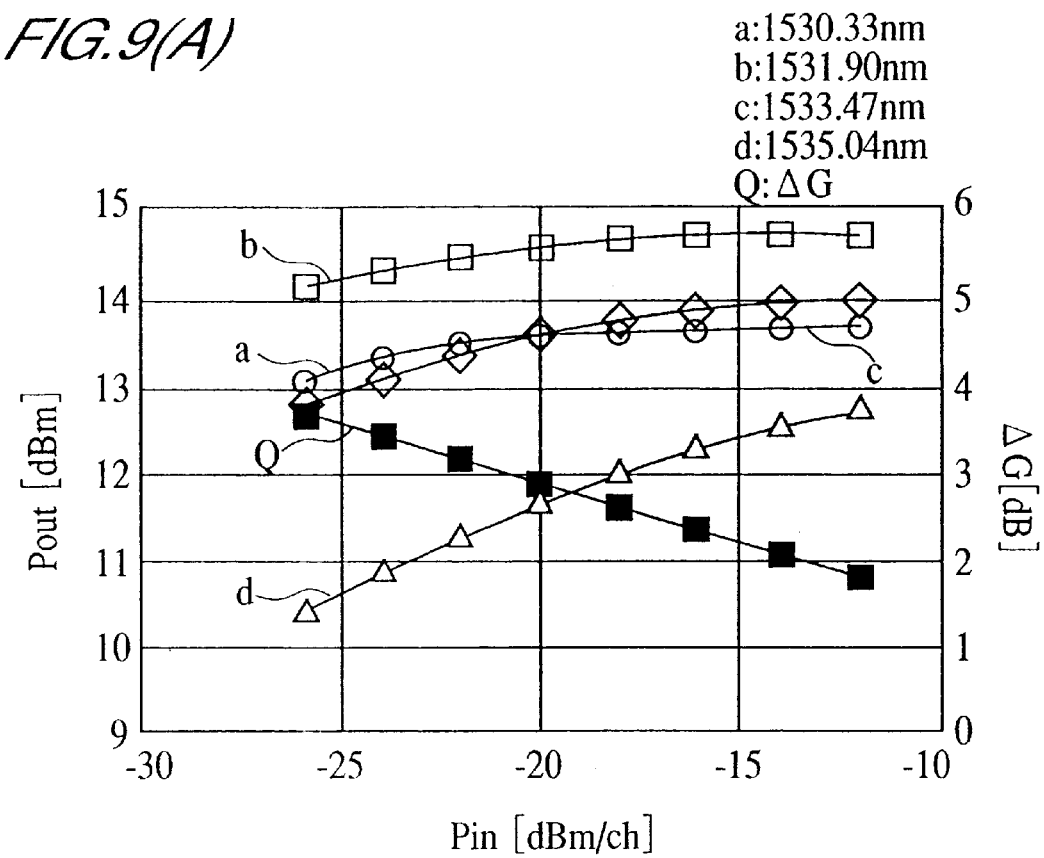
FIG. 9 (including FIGS. 9(A), 9(B), 9(C) and 9(D)) show the relationship between the optical input power and the optical output power for explaining the first embodiment of the present invention.
Figure 9B:
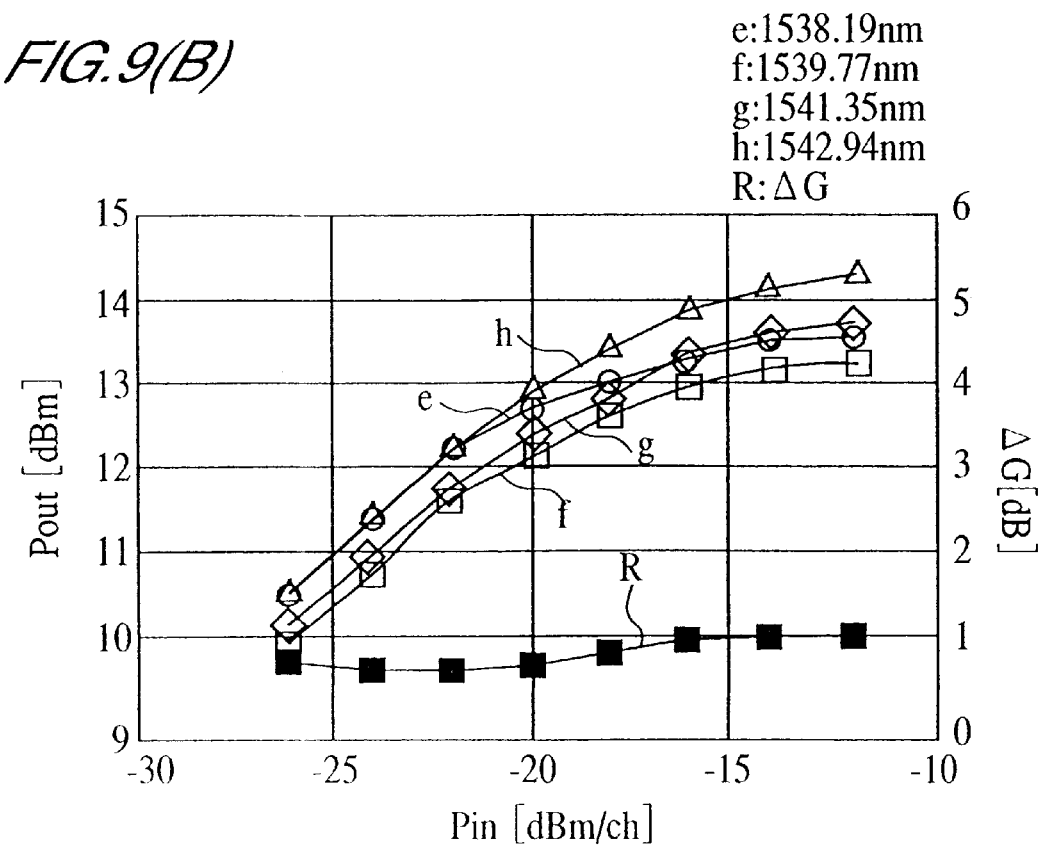
Figure 9C:
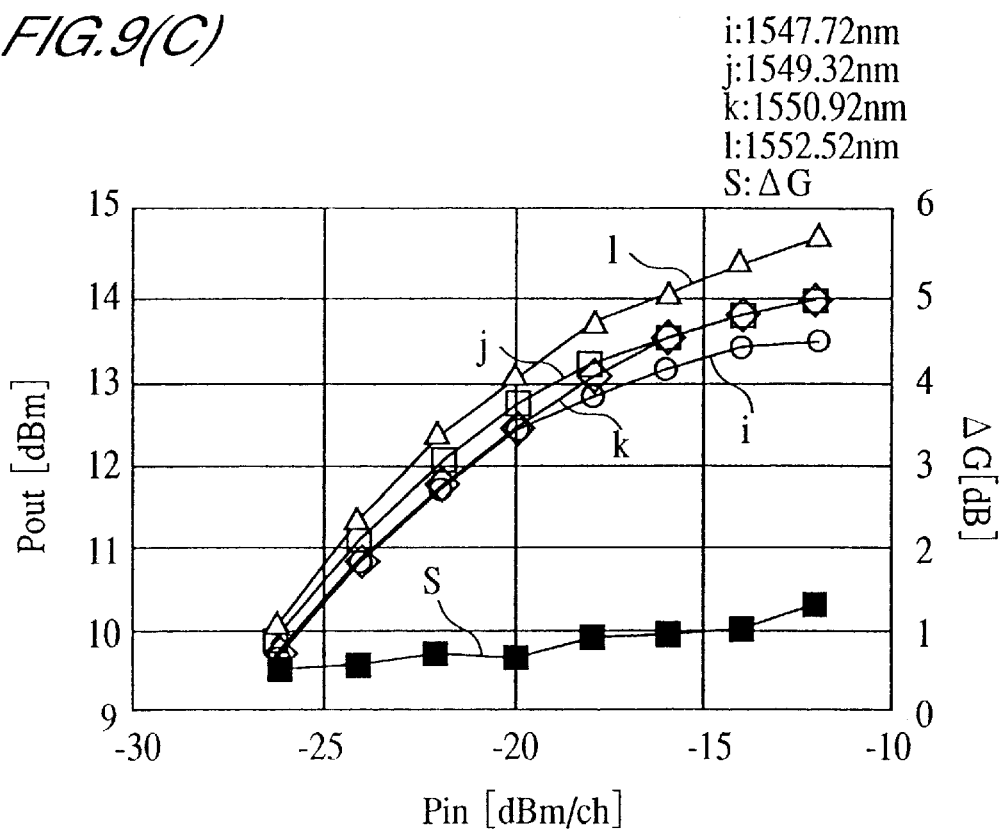
Figure 9D:
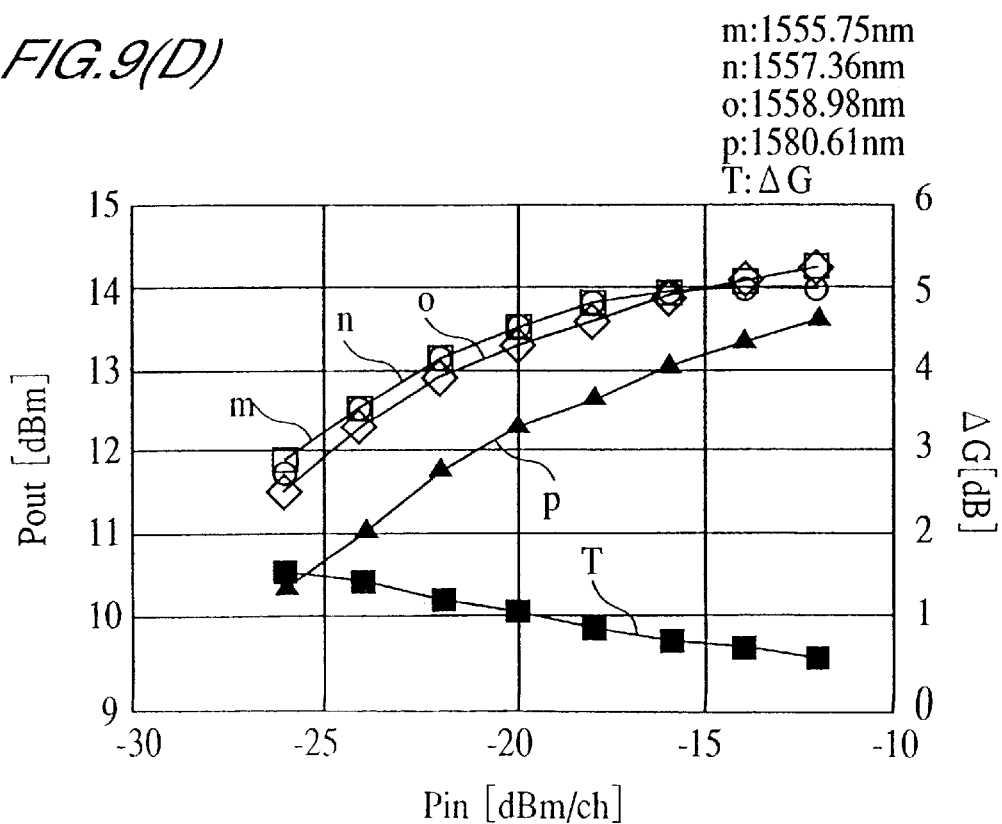

FIG. 9(A) shows results of groups of the following wavelengths: a=1530.33 nm, b=1531.90 nm, c=1533.47 nm and d=1535.04 nm as well as gain deviation curve Q. FIG. 9(B) shows results of groups of the following wavelengths: e=1538.19 nm, f=1539.77 nm, g=1541.35 nm and h=1542.94nm as well as gain deviation curve R. FIG. 9(C) shows results of groups of the following wavelengths: i=1547.72 nm, j=1549.32 nm, k=1550.92 nm and l=1552.52 nm as well as gain deviation curve S. FIG. 9(D) shows results of groups of the following wavelengths: m=1555.75nm, n=1557.36 nm, o=1558.98 nm and p=1580.61 nm as well as gain deviation curve T. In the wavelength range of FIG. 9(A) it is understood that gain deviation $\Delta G$ of the first embodiment of the present invention is approximately 2to 4 dB in contrast to gain deviation $\Delta G$ of a conventional EDFA at approximately 8 to 10 dB. In like manner, in the wavelength range of FIG. 9(B) it is understood that gain deviation $\Delta G$ of the first embodiment of the present invention is approximately 0.6 to 1 dB in contrast to gain deviation $\Delta G$ of a conventional EDFA at approximately 3 dB or more. In like manner, in the wavelength range of FIG. 9 (C) it is understood that gain deviation $\Delta G$ of the first embodiment of the present invention is approximately 0.6 to 1.2 dB in contrast to gain deviation $\Delta G$ of a conventional EDFA at approximately 3 dB or more. In like manner, in the wavelength range of FIG. 9 (D) it is understood that gain deviation $\Delta G$ of the first embodiment of the present invention is approximately 0.6 to 1.7 dB in contrast to gain deviation $\Delta G$ of a conventional EDFA at approximately 3 dB or more. Thus, according to the composition of EDFA 50A of the first embodiment, it can be understood that the optical input power dependency of gain deviation $\Delta G$ is much smaller than conventional EDFA 10A.

Furthermore, in the composition of the first embodiment, EDF 60 (first gain equalizer) is provided in the rear stage of amplification EDF 20 for EDFA 50A. In the present invention however, as long as the combined characteristics of the amplification characteristics of EDF 20 and the absorption characteristics of EDF 60 are flat, gain flattening EDF 60 can be provided at any position with respect to amplification EDF 20. Therefore, this EDF 60 can be provided between the front stage of EDF 20, for example, the front stage of isolator 26 or isolator 26 and WDM coupler 22.

Even further, the first pumping light source of the first embodiment is not limited to a single semiconductor laser but can apply a composition that uses a few pumping light output from a plurality of pumping light sources to carry out compound polarization or wavelength multiplexing. For the former, a few pumping light having identical wavelengths undergo compound polarization by means of a polarizing beamsplitter forming the first pumping light. For the later, a few pumping light having different wavelengths undergo wavelength multiplexing by means of a WDM coupler forming the first pumping light.

According to the composition of EDFA 50A of the first embodiment, because gain flattening EDF 60 functions in a manner that does not transfer a noise component in the amplification process of amplification EDF 20, there is no S/N degradation.

Second Embodiment

Figure 10:
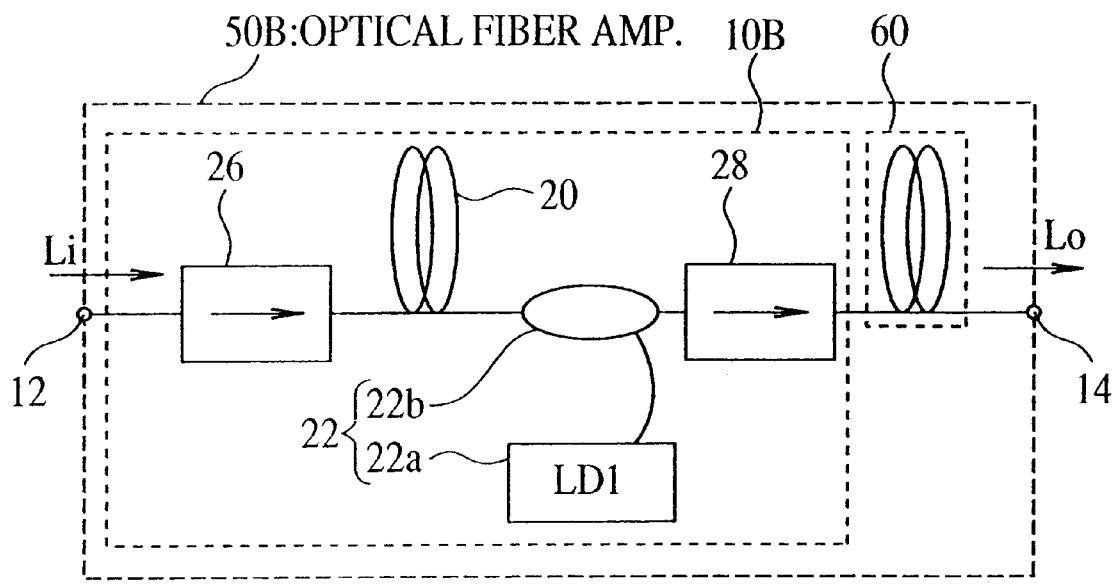
FIG. 10 is a block diagram that provides an explanation of the composition of the second embodiment of an optical fiber amplifier of the present invention.

Next, a second embodiment of the optical fiber amplifier of the present invention will be described. FIG. 10 is a block diagram showing an example of another composition of optical fiber amplifier 50B of the present invention. This optical fiber amplifier 50B comprises an BP type EDFA 10B described referring to FIG. 3(C) as a main optical amplifier along with first gain equalizer 60 being connected between main optical amplifier 10B and output port 14. Therefore, each compositional element of main optical amplifier 10B in FIG. 10 is represented by reference symbols identical to FIG. 3(C). Because this other composition is identical to the first embodiment already described referring to FIG. 5, overlapping descriptions will be omitted as necessary. Further, even if second isolator 28 is not provided in the composition of the second embodiment, the same effects can be achieved.

The compositional example of the second embodiment differs from the compositional example of the first embodiment by the fact that main optical amplifier 10B is a backward pumping type (BP type). In other words, pumping light supply means 22 is connected at the rear stage of amplification EDF 20, namely, between EDF 20 and second isolator 28. Therefore, the first WDM coupler 22b is disposed between EDF 20 and second isolator 28 and the optical signal from EDF 20 passes towards the second isolator 28. In contrast, pumping light from pumping light source 22a passes towards EDF 20 in a direction opposite to the optical signal. Because EDFA 50B of the compositional example of the second embodiment utilizes a BP type EDFA, pumping light leakage passing through EDF 20 does not enter the second optical fiber (EDF)(the first gain equalizer) 60.

According to the second embodiment, in addition to the effects obtained by the above-mentioned BP type EDFA, effects identical to those described in the first embodiment can be achieved. Namely, the simple method of providing non-pumping EDF 60 in the output stage of EDFA 50B makes it possible to increase the output of the optical output power together with making it possible to achieve very accurate flattening of the optical output power extending over a wide input wavelength range and a wide optical input power range.

Third Embodiment

Figure 11:
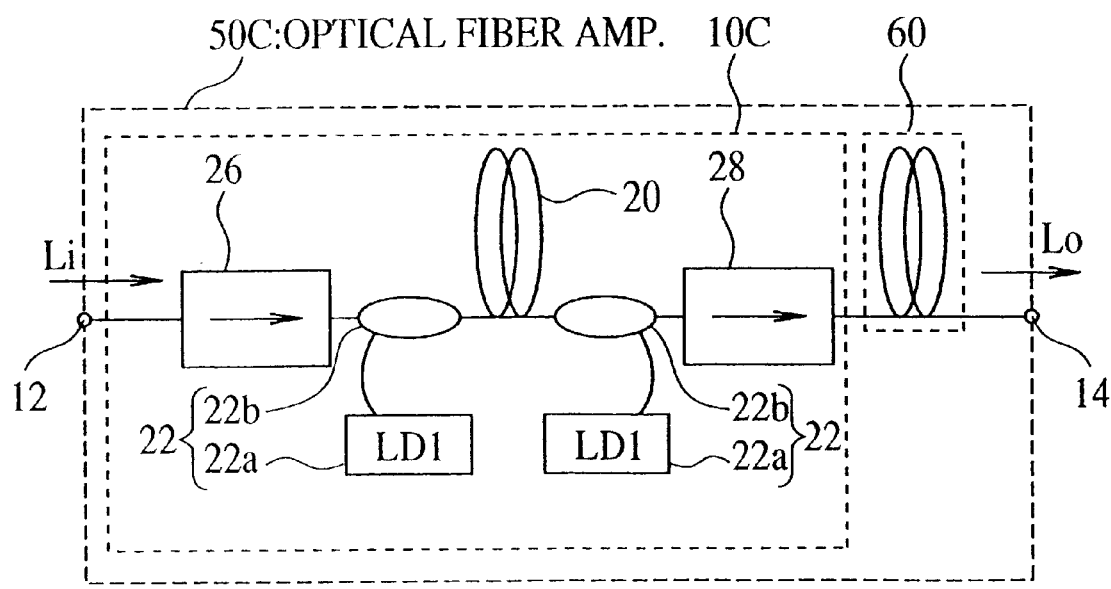
FIG. 11 is a block diagram that provides an explanation of the composition of the third embodiment of an optical fiber amplifier of the present invention.

Next, a third embodiment of the optical fiber amplifier of the present invention will be described. FIG. 11 is a block diagram showing an example of another composition of the optical fiber amplifier of the present invention. This optical fiber amplifier 50C comprises an BDP type EDFA 10C described referring to FIG. 3(D) as a main optical amplifier along with first gain equalizer 60 being connected between main optical amplifier 10C and output port 14. Therefore, each compositional element of main optical amplifier 10C in FIG. 11 is represented by reference symbols identical to FIG. 3(D). Because this other composition is identical to the first embodiment already described referring to FIG. 5, overlapping descriptions will be omitted as necessary.

The compositional example of the third embodiment differs from the compositional example of the first and the second embodiments by the fact that main optical amplifier 10C is a bi-directional pumping type (BDP type). In other words, pumping light supply means 22 is connected at the front stage and the rear stage of amplification EDF 20, namely, between EDF 20, first isolator 26 and second isolator 28. Therefore, one first WDM coupler 22b is disposed between EDF 20 and first isolator 26 and the optical signal and pumping light from first isolator 26 pass towards EDF 20. In contrast, the other first WDM coupler 22b is disposed between EDF 20 and second isolator 28 and the optical signal from EDF 20 passes towards second isolator 28 along with pumping light from pumping light source 22a passing towards EDF 20 in a direction opposite to the optical signal. Because EDFA 50C of the compositional example of the third embodiment utilizes a BDP type EDFA, the optical output has low noise levels as well as a high output.

The reason for this is described below. Forward pumping excites the first optical fiber from the input side. Because of this, a complete inverted population is formed at the portion on the input side of the first optical fiber leading to a favorable noise factor NF. However, the pumping power gradually dampens following transmission of pumping light along the lengthwise direction of the first optical fiber deteriorating inverted population inside the first optical fiber thereby lowering the output from the first optical fiber.

In contrast, because rearward pumping excites the first optical fiber from the output side, an almost complete inverted population is possible at the portion on the output side of the first optical fiber. Because of this, a high power output is obtained although the pumping power on the input side is reduced deteriorating the noise factor NF.

Therefore, because bi-directional pumping excites the first optical fiber (EDF) 20 from the input side and the output side, it becomes possible to form a complete inverted population at the entire region inside the first optical fiber 20. According to bi-directional pumping, a favorable noise factor NF as well as a high output are obtained.

According to the third embodiment, in addition to the effects obtained by the above-mentioned BDP type EDFA, effects identical to those described in the first embodiment can be achieved. Namely, the simple method of providing non-pumping EDF 60 in the output stage of EDFA 50C makes it possible to increase the output of the optical output power together with making it possible to achieve very accurate flattening of the optical output power extending over a wide input wavelength range and a wide optical input power range.

Fourth Embodiment

Figure 12:
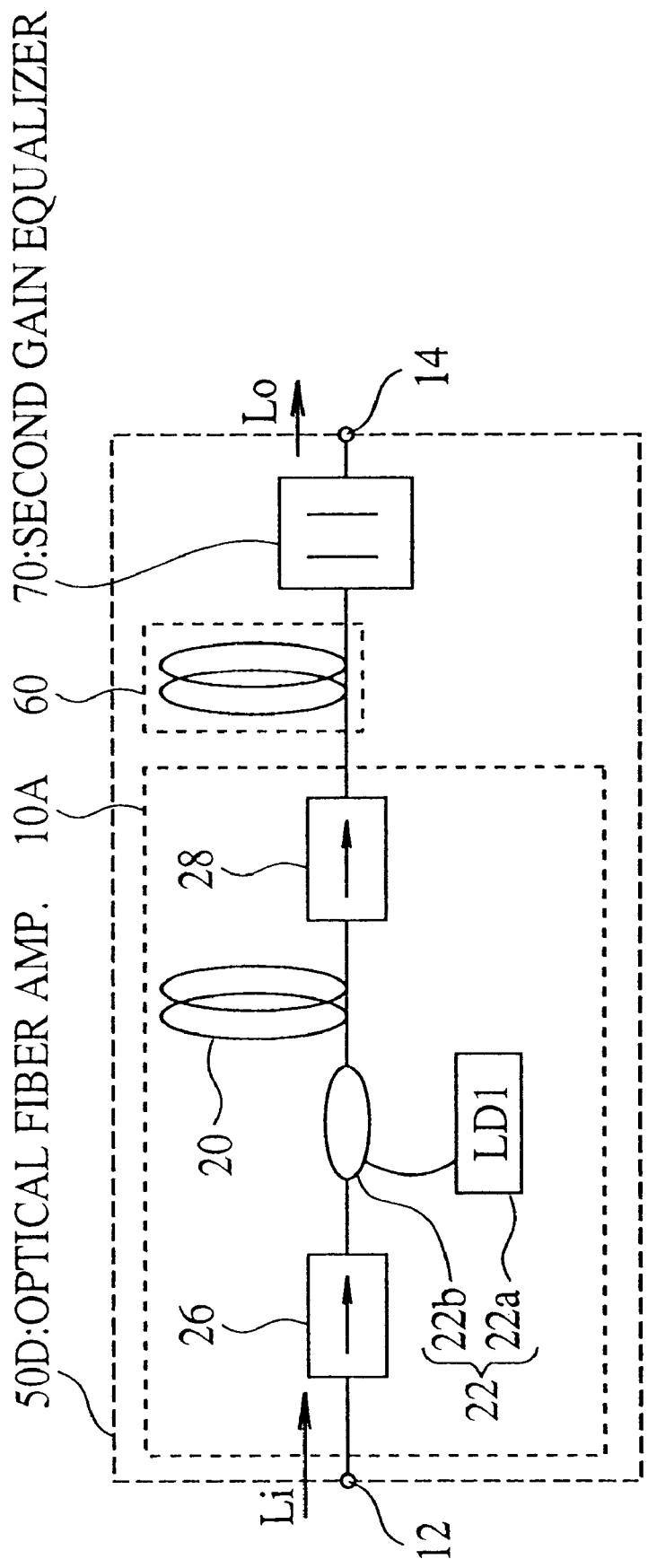
FIG. 12 is a block diagram that provides an explanation of the composition of the fourth embodiment of an optical fiber amplifier of the present invention.

FIG. 12 is a block diagram showing the composition of the fourth embodiment of the optical fiber amplifier of the present invention. Optical fiber amplifier 50D of the fourth embodiment is an example wherein second gain equalizer 70 is disposed between second optical fiber 60 of the rear stage in the composition of the first embodiment and output port 14. This composition is identical to the composition of the first embodiment other than this second gain equalizer 70 being provided. Therefore, overlapping descriptions will be omitted as necessary. A compositional element without a drive portion to flatten the gain such as an interference filter or a fiber grating can be used as second gain equalizer 70.

According to the example of the composition of the fourth embodiment shown in FIG. 12, first gain equalizer 60 (EDF) can achieve gain flattening of the output quite effectively. However, when gain flattening of the output is not sufficiently carried out in a narrow wavelength range within a fixed wavelength range of the optical input signal, gain flattening will be carried out again by this second gain equalizer for the output of this narrow wavelength range. This makes it possible to achieve sufficient flattening extending over the entire fixed wavelength range.

According to the composition of the optical fiber amplifier of the fourth embodiment, by means of providing a simple composition wherein non-pumping first gain equalizer 60 (EDF) is disposed in the output stage of conventional EDFA 10A and second gain equalizer 70, without a movable portion, is also provided, the optical output power can be very accurately flattened extending over a wide input wavelength range and a wide optical input power range.

Fifth Embodiment

Figure 13:
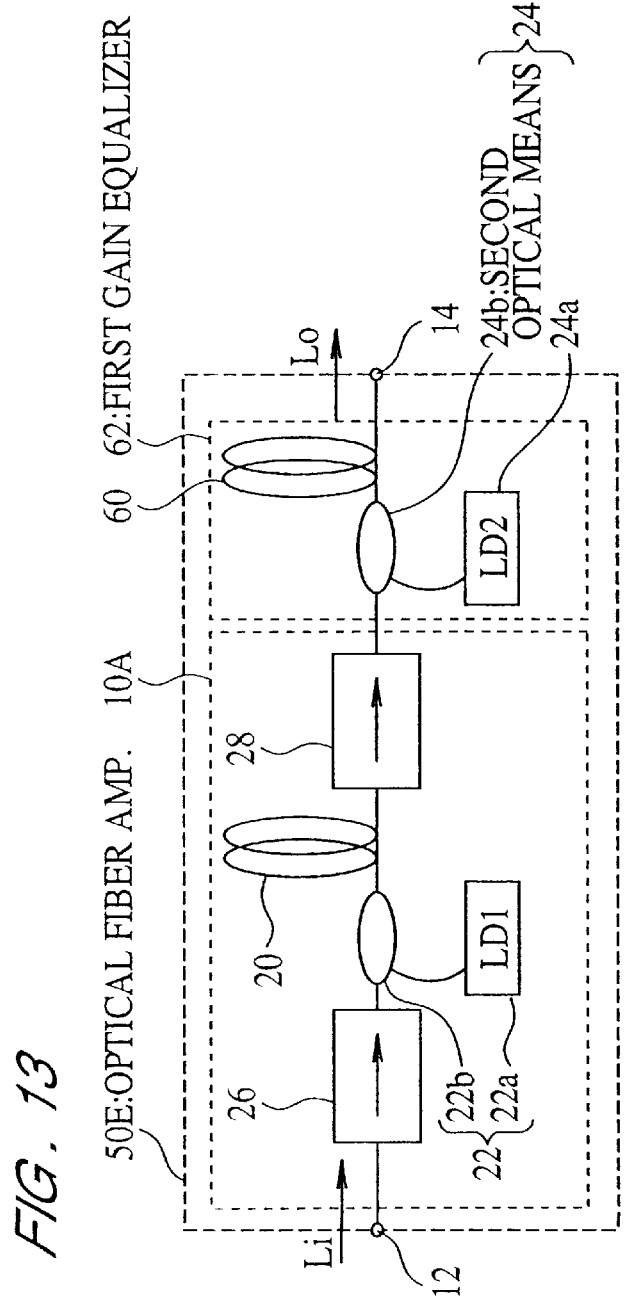
FIG. 13 is a block diagram that provides an explanation of the composition of the fifth embodiment of an optical fiber amplifier of the present invention.

Next, a fifth embodiment of the optical fiber amplifier of the present invention will be described. FIG. 13 is a block diagram showing an example of the composition of optical fiber amplifier 50E of the present invention. This optical fiber amplifier 50E comprises an BP type EDFA 10A described referring to FIG. 3(B) as a main optical amplifier along with a pumping type first gain equalizer 62 being connected between main optical amplifier 10A and output port 14. Therefore, each compositional element of main optical amplifier 10A in FIG. 13 is represented by reference symbols identical to FIG. 3(B). Because this other composition is identical to the first embodiment already described referring to FIG. 5, overlapping descriptions will be omitted as necessary.

The compositional example of the fifth embodiment differs from the compositional example of the first embodiment by the fact that main optical fiber amplifier 50E is a forward pumping type (FP type) and first gain equalizer 62 being a pumping type and connected between main optical fiber amplifier 50E and output port 14. In other words, in this compositional example of the fifth embodiment, first gain equalizer 62 is comprised by second pumping light supply means 24 and second optical fiber 60 (EDF). This second pumping light supply means 24 is connected between second isolator 28 and EDF 60. Second pumping light supply means 24 comprises, for example, second pumping light generation source (LD2) 24a such as a semiconductor laser and second optical means 24b. This second optical means 24b is connected between second isolator 28 and second optical fiber (EDF) 60. Further, second optical means 24b can pass the optical signal from first optical fiber 20 towards EDF 60 along with passing pumping light towards EDF 60, for example, the optical means can be formed by a second WDM coupler or a second polarization beam splitter. The example here uses a second WDM coupler 24b.

The fifth embodiment differs from the compositional example of the first to the fourth embodiments by the fact the composition is such that the second pumping light from second pumping light source 24a enters gain flattening EDF 60 through second WDM coupler 24b. In this composition however, setting the power of the second pumping light to a weak setting will result in absorption characteristics weaker than a non-pumping state in which EDF 60 does not amplify the signal.

This point will be described below. As already described referring to FIG. 6, the EDF operates with an absorption function when ratio N1 of electrons located at a ground state (base level) is more than ratio $N_2$ of electrons located at an upper level (characteristic curves shown in FIG. 6). The absorption characteristics of the EDF differ depending on the degree of ratio $N_1$ of electrons located at a ground state. Therefore, when the absorption characteristics of second optical fiber 60 (EDF) used in optical fiber amplifier 50E do not have favorable reverse characteristics in comparison to the amplification characteristics of second optical fiber 20 (EDF), satisfactory gain flattening cannot be achieved if the absorption characteristics of EDF 60 are not adjusted. Because of this, using this second pumping light very slightly excites EDF 60 developing favorable reverse characteristics of EDF 60 with a smaller ratio N1 of electrons located at a ground state than the ratio of electrons for a non-pumping state. In this manner optimum gain flattening can be achieved in EDF 60 by means of providing favorable absorption characteristics from, for example, characteristics curve C3 (non-pumping) to characteristics curve C6 (slight pumping) shown in FIG. 6.

Further, in the fifth embodiment it is preferable to use a composition that allows the power of the pumping light to be varied as second pumping light supply means 24a and to adjust in advance the absorption characteristics of EDF 60 at the time when the optical fiber amplifiers are shipped. Even further, although an FP type EDF is used to excite EDF 60 in the embodiment shown in FIG. 13, this embodiment is not limited to this and a BP type or BDP type EDF can be used to excite EDF 60.

According to the fifth embodiment, effects identical to those described in the first embodiment can be achieved. Namely, a simple composition wherein a pumping adjustment type EDF 60 is provided in the output stage of EDFA 50E makes it possible to increase the optical output power together with making it possible to achieve very accurate flattening of the optical output power extending over a wide input wavelength range and a wide optical input power range.

Sixth Embodiment

Figure 14:
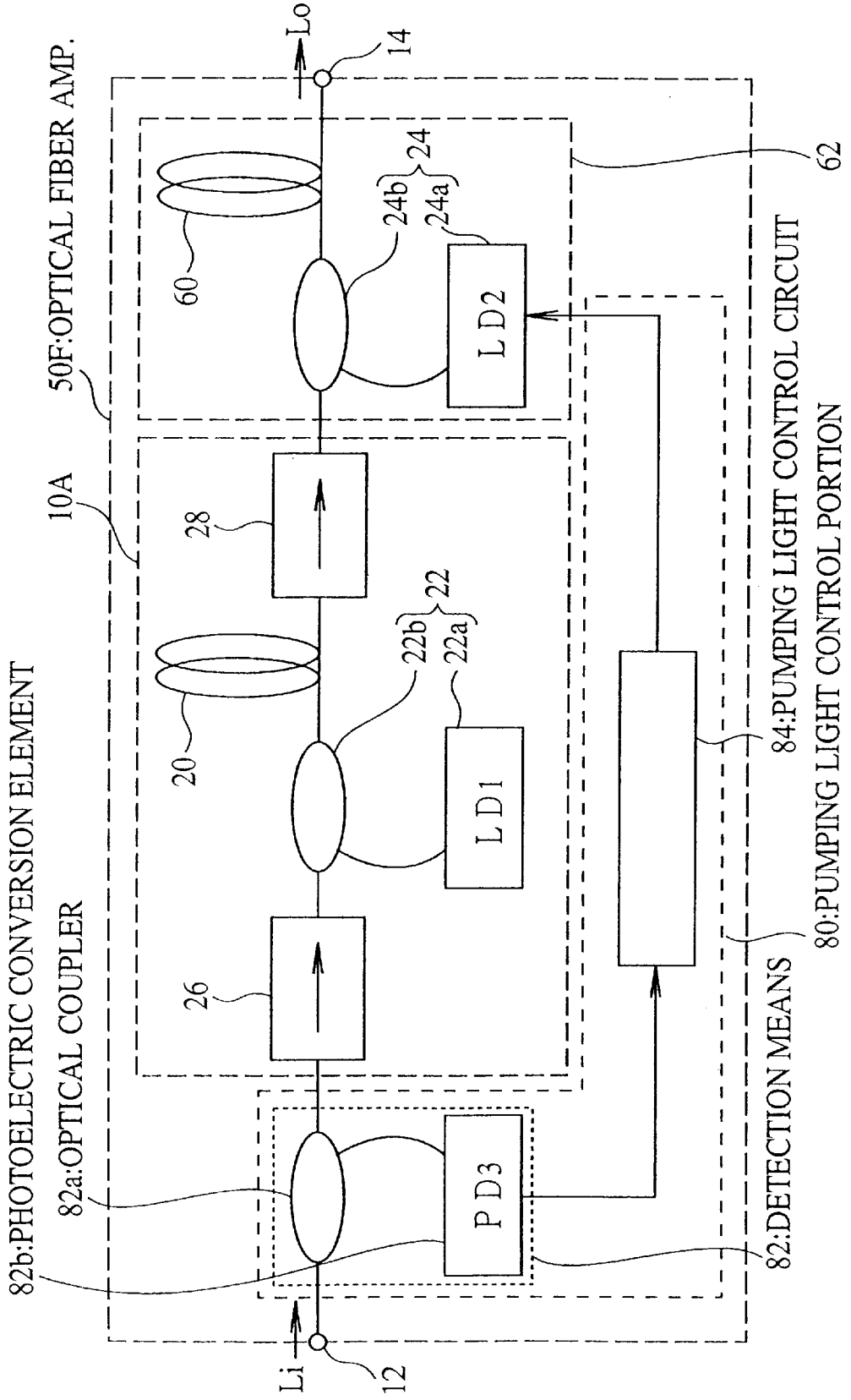
FIG. 14 is a block diagram that provides an explanation of the composition of the sixth embodiment of an optical fiber amplifier of the present invention.

Next, the composition of a sixth embodiment wherein the optical fiber amplifier of the present invention will be described. FIG. 14 is a block diagram showing an example of the composition of the sixth embodiment. In the above-mentioned composition of the fifth embodiment, this optical fiber amplifier 50F has a composition provided with pumping light control portion 80 that functions to adjust the absorption characteristics of first gain equalizer 62 such that the characteristics follow the power of the optical input signal Li. Therefore, compositional elements identical to the fifth embodiment represented by identical reference symbols will be omitted as necessary.

This pumping light control portion 80 comprises, for example, detection means 82 that detects the power of the optical signal input from input port 12 and pumping light control circuit 84 that adjusts the power of the second pumping light in response to this power (of the optical signal). This detection means 82 is a means to monitor input power and is comprised by, for example, optical coupler 82a for monitoring input power, and photoelectric conversion element 82b, such as a photo-diode (PD3), for carrying out photoelectric conversion on light read by optical coupler 82a. The signal from photoelectric conversion element 82b is supplied to pumping light control circuit 84. A control signal is sent from this circuit 84 to pumping light source 24a and then the power of the second pumping light generating from pumping light source 24a is controlled based on the power of the optical input.

In this embodiment optical coupler 82a is disposed in the front stage of first isolator 26. Optical coupler 82a divides the optical signal that was input into two portions (however, the branching ratio does not matter) and one of the optical branches is output on first isolator 26 side in the main pathway and the other optical branch is output to photoelectric conversion element 82. The power Pin of the optical input signal is detected by detection means 82 and then the power of the second pumping light is controlled based on the detected power Pin. Further, the circuit structure of pumping light control portion 80 itself uses widely known technology allowing it to be easily constructed.

For example, other than the composition of this embodiment, optical coupler 82a can be disposed at the rear stage of first isolator 26, the rear stage of second isolator 28 or the rear stage of EDF 60.

In the following the utilization of pumping light control portion 80 to control the power of the second pumping light will be described in detail. As can be understood from previously described FIG. 2, the wavelength dependency output (gain) deviation ΔG of the optical output from first optical fiber 20 (EDF) grows smaller as optical input power Pin grows larger. In contrast, the wavelength dependency output deviation ΔG grows larger as the optical input grows smaller. From this fact and from the absorption characteristics of the EDF already described referring to FIG. 6, the following two points are understood when executing absorption processing using EDF 60. As optical input power Pin grows larger, namely, as wavelength dependency output deviation ΔG grows smaller, the characteristics of curve C6 with a small ΔG from among absorption characteristic curves C3 to C6 can be applied to EDF 60. Further, as optical input power Pin grows smaller, namely, as wavelength dependency output deviation ΔG grows larger, the characteristics of curve C3 with a large ΔG from among absorption characteristic curves C3 to C6 can be applied to EDF 60.

In addition, ratio $N_2$ of electrons located at the upper level is more than ratio N1 of electrons located at the ground state (base level) for an EDF that develops absorption characteristic curves with a small output deviation ΔG. Accordingly, it needs to excite the EDF. Therefore, as optical input power Pin grows larger, pumping light control portion 80 carries out control such that the power of the second pumping light from pumping light source 24a is increased. In contrast, as optical input power Pin grows smaller, pumping light control circuit 84 carries out control such that the power of the second pumping light from pumping light source 24a is decreased. While being a matter of course, even if optical input power Pin is very large, injection of pumping light is not carried out by the above-mentioned control until EDF 60 executes a degree of amplification. In other words, pumping light control portion 80 controls EDF 60 within a range of $N_1 > N_2$ wherein ratio $N_2$ of electrons located at the upper level does not exceed ratio $N_1$ of electrons located at the ground state. Control of the power of the second pumping light from second pumping light source 24a can be continuous or in stages.

Moreover, this control is suitably adjusted in advance by means of repeatedly testing control for each optical fiber amplifier 50F using pumping light control portion 80 and suitably adjusting the relationship between the detected input power, the magnitude of the control signal based on that input power, and the power of the second pumping light from the second pumping light source.

In this manner, the simple composition of pumping light control portion 80 in which optical fiber amplifier 50F of the sixth embodiment is added to the composition of the fifth embodiment allows a composition wherein the power of the second pumping light injected into gain flattening EDF 60 is controlled in response to the optical input power.

Therefore, the optical fiber amplifier of the present invention makes it possible to achieve very accurate flattening of the optical output power extending over a wide input wavelength range and a wide optical input power range. Even further, the optical fiber amplifier of the sixth embodiment can also reduce the wavelength dependency output deviation ΔG more than the compositional examples of each embodiment already described.

According to the example of the composition of the sixth embodiment, a method is provided that adjusts the power of the pumping light that excites absorption (gain flattening) EDF 60 and controls the flattening function. However, simultaneous with this, for example, the objective can be to uniformly control the optical output power of the optical fiber amplifier and then control the pumping light power to EDF 20 in response to the optical input power. In other words, together with controlling the power of the second pumping light to EDF 60 using pumping light control portion 80, the power of the first pumping light to EDF 20 can be controlled as well. For this case, it is necessary to control first and second pumping light sources 22a and 24a such that increases and decreases in the power of the first pumping light and in the power of the second pumping light using pumping light control portion 80 are opposite to each other. For example, when the optical input power is reduced in order to uniformly control the output power of the optical fiber amplifier , the power of the first pumping light to amplification EDF 20 is increased. At this time, the supply of second pumping light power to absorption EDF 60 is reduced.

In the embodiment described referring to FIG. 14, detection of the optical input power is carried out in the front stage of amplification EDF 20.

The detection value corresponding to the above-mentioned optical input power can be obtained from a position in the center (center stage) between amplification EDF 20 and absorption EDF 60 and then the power of the second pumping light injected to absorption EDF 60 controlled. In addition to this, the detection value corresponding to the above-mentioned optical input power can be obtained from the optical output at the rear stage of absorption EDF 60 and then the power of the second pumping light injected to absorption EDF 60 controlled. In addition to this as well, the optical signal power at a plurality of locations in the main pathway can be obtained and then the power of the second pumping light injected to absorption EDF 60 controlled. The position where detection of the optical input signal is carried out can be suitably set depending on the design.

Seventh Embodiment

Figure 15:
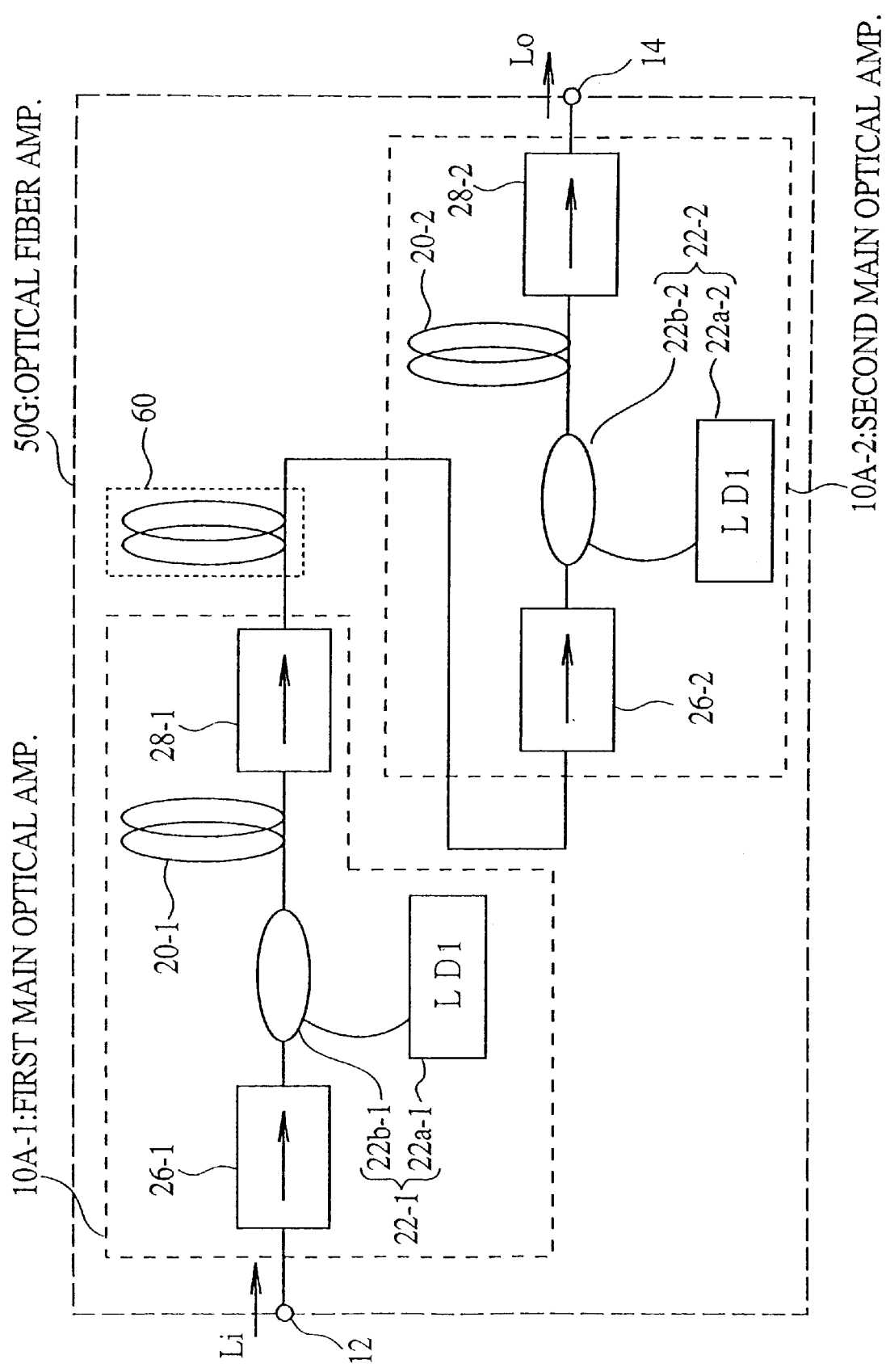
FIG. 15 is a block diagram that provides an explanation of the composition of the seventh embodiment of an optical fiber amplifier of the present invention.

Next, referring to FIG. 15, an optical fiber amplifier provided with an amplification EDF and an absorption EDF held in a two-stage design will be described. FIG. 15 is a block diagram showing an optical fiber amplifier of the seventh embodiment of the present invention. EDFA 50G of this embodiment has a composition provided with a second main optical amplifier equivalent to the optical fiber amplifier of the conventional composition shown in FIG. 3 (B) in the first embodiment. In other words, EDFA 50G is composed such that first gain equalizer 60 is connected between first and second main optical amplifiers 10A-1 and 10A-2. The composition of these first and second main optical amplifiers 10A-1 and 10A-2 themselves have a composition identical to the conventional optical fiber amplifier 10A already described referring to FIG. 3(B). Therefore, detailed descriptions will be omitted as necessary. In FIG. 15 however, an additional number 1 is attached to each compositional element of the first main amplifier after the reference symbol each compositional element of FIG. 3(B). In addition, in like manner an additional number 2 is attached to each compositional element of the second main amplifier after the reference symbol each compositional element of FIG. 3(B). Therefore, for example, 20-1 and 20-2 are first optical fibers (amplification EDFs), 22-1 and 22-2 are first pumping light supply means, 22a-1 and 22-2 are first pumping light sources, 22-1b and 22-2b are first WDM couplers (first optical means), 26-1 and 26-2 are first isolators (non-reciprocal means), and 28-1 and 28-1 are second isolators (non-reciprocal means).

In the composition of the seventh embodiment, the absorption characteristics of gain flattening second EDF 60 are determined as follows. Two amplification EDFs 20-1 and 20-2 are equivalently assumed to be replaced by one EDF. The absorption characteristics of second EDF 60 are set such that the amplification characteristics of the equivalent EDF are opposite characteristics. The relationship of this type of absorption characteristic interval can be obtained easily when the absorption cross section σa(λ) of gain flattening second EDF 60 and emission cross section σe(λ) are equal to the equivalent absorption cross section σa (λ) and the equivalent emission cross section σe(λ) of the equivalent EDF.

According to EDFA 50G of the seventh embodiment, the wavelength division multiplexing signal output from first stage main optical amplifier 10A-1 undergoes absorption processing by means of second EDF 60. For this case, the absorption processing executes such that the wavelength division multiplexing signal output from second EDF 60 undergoes amplification processing by means of second stage main optical amplifier 10A-2 and the power of the obtained optical signal is flattened. The wavelength division multiplexing signal that underwent absorption processing by means of second EDF 60 and was output from this EDF is amplified by second stage main optical amplifier 10A-2. Therefore, the final output optical signal Lo of optical fiber amplifier 50G of the composition in this embodiment is flattened extending over a wide input wavelength range and a wide optical input power range.

Although the above-mentioned seventh embodiment has a composition provided with second EDF 60 between first stage first EDF 10A-1 and second stage first EDF 10A-2, the locations where this second EDF 60 is disposed can be other positions. For example, second EDF 60 can be disposed at the front stage of first stage first EDF 10A-1 or the rear stage of second stage first EDF 10A-2 with effects being obtained identical to the composition of the above-mentioned seventh embodiment. When second EDF 60 is disposed at the front stage of first stage first EDF 10A-1, noise factor NF is presumed to deteriorate more than the composition of the seventh embodiment shown in FIG. 15.

Further, when second EDF 60 is disposed at the rear stage of second stage first EDF 10A-2, noise factor NF is presumed to deteriorate more than the composition of the seventh embodiment shown in FIG. 15. The reason for this is as follows. Basically, when one gain flattening second EDF 60 is disposed at the rear stage of second stage first EDF 10A-2, the wavelength division multiplexing signal entering one gain flattening first EDF 60 is amplified in two stages thereby increasing the wavelength dependency output deviation ΔG of this optical signal to a large degree. Further, there is almost no optical signal that will enter the EDF in the wavelength region wherein the optical power is flattened with a fixed wavelength range or the output deviation ΔG is remarkably large. Because of this, sufficient flattening cannot be achieved with only one gain flattening second EDF 60.

In contrast to this, EDFA 50G of the seventh embodiment has a composition provided with one second EDF 60 between first stage first EDF 10A-1 and second stage first EDF 10A-2.

Therefore, because a wavelength division multiplexing signal entering one gain flattening second EDF 60 is an optical signal amplified in one stage, the wavelength dependency output deviation ΔG of this optical signal does not increase that much. Further, as already described referring to FIG. 6, two EDFs, first EDF 20-1 and 20-2 have an amplification peak in the 1530 nm wavelength band. Because of this, when the amplification function of these first EDFs is small as in, for example, characteristic curves C8 and C9, the gain of the optical signals from these first EDFs will be flat in a range other than the 1530 nm wavelength band. Therefore, by means of making the gain of the optical signal from first stage first EDF 20-1 in a 1530 nm band smaller than the gain in another band using gain flattening second EDF 60 disposed between the stages, an amplification function can be executed such that the gain in a 1530 nm band increases slightly in second stage first EDF 20-2 and the gain in another band is maintained as is in a flat state. In this manner, the composition of the seventh embodiment makes it possible to achieve flattening in a fixed wavelength range of the optical signal finally output compared to when one second EDF 60 is disposed at the rear stage of second stage first EDF 20-2.

Even further, the composition of the seventh embodiment makes it possible to use second EDF 60 to control growth of signal gain of first stage first EDF 20-1 in a 1530 nm band. As a result, the pumping light power used in the amplification function of the signal in a 1530 nm band in second stage first EDF 20-2 is reduced and the pumping light power of that portion moves towards the 1550 nm band. Therefore, the composition of the seventh embodiment makes it possible to realize a high output power in a wide wavelength range extending over the 1530 nm to 1550 nm band in addition to realizing flattening of the optical output signal. As already described, on the whole, the optical output power (in particular, optical output power in a 1550 nm band) can be increased in comparison with the optical output power when using another gain equalizing means (for example, grating fiber or interference filter).

In addition to increasing this output, EDFA 50G of the seventh embodiment can obtain effects identical to EDFA 50A of the first embodiment. In other words, it is possible to achieve very accurate flattening of the optical output power extending over a wide input wavelength range and a wide optical input power range by means of adding the simple composition wherein second EDF 60 that carries out absorption processing.

Here, because gain flattening second EDF 60 is disposed between the first stage and second stage first EDFs 20-1 and 20-2, we expect it to be possible to achieve even more accurate flattening of the optical output power compared to the case when second EDF 60 is disposed at the front stage of first stage first EDF 20-1 or the rear stage of second stage first EDF 20-2.

Further, in the compositional example shown in FIG. 15, both first stage and second stage first EDFs 20-1 and 20-2 are illustrated as EDFs excited by an FP method. However, these two first EDFs can be excited by a combination of FP type, BP type and BDP type pumping methods.

Another Embodiment

The present invention is not limited to the above-mentioned embodiments. For example, applying a composition in which pumping light is injected into a gain flattening EDF that was described in the fifth and sixth embodiments to the composition of an EDFA 50G of the seventh embodiment is also suitable.

In each of the above-mentioned embodiments, the intent is to provide equal absorption cross sections and emission cross sections of amplification EDFs and gain flattening EDFs. However, if it is possible for the amplification characteristics of an amplification EDF and the absorption characteristics of a gain flattening EDF to have opposing characteristics which cancel each other out, the absorption cross sections and emission cross sections in both EDFs will differ only slightly.

Even further, positions where isolators, WDM couplers, and optical couplers are arranged in an EDF are not limited to the positions described in each of the embodiments described above. These embodiments achieve each objective and the positions can be suitable made depending on the design.

In the first embodiment described above, reference was made to a composition that prevents leakage of pumping light to an amplification EDF with respect to a gain flattening EDF. The composition to prevent this leakage can be suitably applied to another embodiment. However, in, for example, the composition of the fifth and sixth embodiments wherein the absorption characteristics of a gain flattening EDF are intentionally changed, it is not necessary to prevent leakage. Basically, when there is a necessity to provide a composition that prevents leakage of pumping light to an amplification EDF with respect to a gain flattening EDF, this composition can be formed, for example, using another suitable optical means such as an isolator or filter having wavelength selectivity. The selection of this optical means can be done based on the wavelength of the pumping light of the amplification EDF. For example, when the wavelength of the pumping light is 1.48 nm, it is preferable to use a filter and isolator as the optical means and when the wavelength of the pumping light is 0.98 nm, an isolator by itself can be used.

In each of the above-mentioned embodiments, an EDFA was described based on a one stage or two stage composition, although an EDFA composition of three stages or more can be suitable applied to the present invention.

Even further, in each of the above-mentioned embodiments, although amplification and absorption (gain flattening) optical fibers were described as EDFs, in the optical fiber amplifiers of the present invention optical fibers other than EDFs can be used as these optical fibers. For example, optical fibers can be used such as praseodymium-doped optical fiber amplifiers, neodymium-doped optical fiber amplifiers and optical fiber amplifiers doped with other rare earth elements.

As made clear from the above-mentioned descriptions, according to the optical fiber amplifiers of the present invention, amplification optical fibers (first optical fibers) and absorption optical fibers (second optical fibers) are provided. The amplification optical fibers amplify a wavelength division multiplexing signal in a state excited by external pumping light. Normally, the wavelength division multiplexing signal output from the amplification optical fibers differs depending on the wavelength of the optical power. Therefore, this output wavelength division multiplexing signal has a wavelength dependency output power deviation $\Delta G$. Furthermore, this output deviation $\Delta G$ changes depending on the optical input power. Thereupon, the object of the present invention is to compensate for the wavelength dependency output power deviation $\Delta G$ with the above-mentioned absorption optical fibers being disposed in the transmission path of the optical signals of the optical fiber amplifiers. These absorption optical fibers have absorption characteristics opposite to the amplification characteristics of all the optical fiber amplifiers. Because of this, the absorption characteristics change in correspondence to the input power. Therefore, these absorption optical fibers can either compensate for or reduce the above-mentioned output deviation $\Delta G$. In this manner, the optical fiber amplifiers of the present invention have a simple composition in which absorption optical fibers are placed into the optical signal transmission path of the optical fiber amplifiers making it possible to achieve very accurate flattening of the optical output power extending over a wide fixed wavelength range and a wide fixed optical input power range more than a conventional case.

What is claimed is:

1. Optical fiber amplifiers using optical fibers to amplify optical signals which enter the amplifiers from an input port and are emitted from an output port comprising:

main optical amplifiers and first gain equalizers connected to said main amplifiers between said input port and said output port;

said main optical amplifiers comprising first optical fibers which amplify said optical signals, first pumping light supply means which supply a first pumping light to excite said first optical fiber, and non-reciprocal means which control the reflection of light on said input port and said output port;

said first gain equalizers comprising second optical fiber for flattening a gain of a power of the optical signal to be emitted from said output port within a fixed wavelength range, said second optical fiber having a wavelength dependency of amplification characteristics substantially identical to those of said first optical fibers and a wavelength dependency of absorption characteristics substantially identical to those of said first optical fiber within a fixed wavelength range, wherein said optical signals are WDM signals; and said second optical fiber comprises a material which can perform stimulated emission and is in a state of non-inverted population.

2. The optical fiber amplifiers according to claim 1, wherein said second optical fiber has a wavelength dependency of amplification characteristics identical to said first optical fiber and a wavelength dependency of absorption characteristics identical or similar to said first optical fiber within a fixed wavelength range.

3. The optical fiber amplifiers according to claim 1, wherein the flattening of said gain utilizes the wavelength dependency of absorption characteristics of said second optical fiber to compensate a wavelength dependency output power deviation based on amplification characteristics of said first optical fiber.

4. The optical fiber amplifiers according to claim 1, wherein a first equivalent optical fiber has a light absorption cross-sectional surface area and a stimulated emission cross-sectional surface area identical to a light absorption cross-sectional surface area and a stimulated emission cross-sectional surface area of a second equivalent optical fiber when it is assumed that said first optical fiber is replaced by said first equivalent optical fiber and said second optical fiber is replaced by said second equivalent optical fiber.

5. The optical fiber amplifiers according to claim 1, wherein said first and second optical fibers are cut from one optical fiber produced under identical manufacturing conditions.

6. The optical fiber amplifiers according to claim 1, wherein said non-reciprocal means comprises first isolators connected between said input port and said first optical fiber and second isolators connected between said first optical fiber and said output port.

7. The optical fiber amplifiers according to claim 1, comprising second pumping light supply means that supplies a second pumping light to excite said second optical fiber and change the wavelength dependency of absorption characteristics of the second optical fiber to characteristics different from the wavelength dependency of absorption characteristics during a non-pumping state.

8. The optical fiber amplifier according to claim 7, further comprising detection means that detects the power of said optical signal, and pumping light control circuit that controls the power of said second pumping light from said second pumping light supply means.

9. The optical fiber amplifiers according to claim 1, comprising a prevention means that prevents said first pumping light from said first pumping light supply means from entering said second optical fiber.

10. The optical fiber amplifiers according to claim 1, wherein said first pumping light supply means has a first pumping light source that generates said first pumping light, and a first optical means wherethrough said optical signal and said first pumping light pass through; and said first optical means is connected to said input port, said first pumping light source and said first optical fiber with said optical signal and said first pumping light being optically multiplexed passing through to said first optical fiber.

11. The optical fiber amplifiers according to claim 1, wherein said first pumping light supply means has a first pumping light source that generates said first pumping light, and a first optical means wherethrough said optical signal and said first pumping light pass through; and said first optical means is connected to said output port, said first pumping light source and said first optical fiber with said optical signal passing through to said output port side and said first pumping light passing through towards said first optical fiber.

12. The optical fiber amplifiers according to claim 1, wherein said first gain equalizers are connected between said main optical amplifiers and said output port.

13. The optical fiber amplifiers according to claim 1, wherein said first gain equalizers are connected between said main optical amplifiers and said input port.

14. The optical fiber amplifiers according to claim 1, wherein said first gain equalizers are connected between said main optical amplifiers and said output port, and a second gain equalizer is provided between said first gain equalizers and said output port.

15. The optical fiber amplifier according to claim 14, wherein said second gain equalizer is comprised by an interference filter, a fiber grating an etalon filter or a Mach-Zehnder type filter.

16. The optical fiber amplifier according to claim 7, wherein said second pumping light supply means has a second pumping light source that generates said second pumping light, and a second optical means wherethrough said signal and said second pumping light pass; and said second optical means passes an optical signal towards said second optical fiber or an optical signal from said second optical fiber in addition to passing said second pumping light towards said second optical fiber.

17. An optical fiber amplifier using optical fibers to amplify optical signals which enter the amplifier from an input port and are emitted from an output port comprising:

first and second main optical amplifiers and first gain equalizers connected to said first and second main amplifiers between said input port and said output port;

said first and second main optical amplifiers comprising first optical fibers which amplify said optical signals, first pumping light supply means which supply a first pumping light to excite said first optical fiber, and non-reciprocal means which control the reflection of light on said input port and said output port;

said first gain equalizers comprising second optical fiber for flattening a gain of a power of the optical signal to be emitted from said output port within a fixed wavelength range, said second optical fiber having a wavelength dependency of amplification characteristics substantially identical to those of said first optical fiber and a wavelength dependency of absorption characteristics substantially identical to those of said first optical fiber within a fixed wavelength range, wherein said optical signals are WDM signals; and said second optical fiber comprises a material which can perform stimulated emission and is in a state of non-inverted population.

18. The optical fiber amplifiers according to any of claim 1 to claim 17, wherein said first and second optical fibers are doped with rare earth elements.

19. The optical fiber amplifiers according to claim 10 or claim 11, wherein said first optical means is a polarization beam splitter or a WDM coupler.

20. The optical fiber amplifier according to claim 16 wherein said second optical means is a polarization beam splitter or a WDM coupler.

21. A method to flatten the power of a wavelength division multiplexing signal comprising the steps of:

using optical fiber amplifiers to amplify a wavelength division multiplexing signal that enters from an input port and is emitted from an output port;

providing first and second optical fibers connected in series to said optical fiber amplifiers, said second optical fiber comprising a material which can perform stimulated emission and is in a state of non-inverted population, said second optical fiber having a wavelength dependency of amplification characteristics substantially identical to that of said first optical fiber and a wavelength dependency of absorption characteristics substantially identical to that of said first optical fiber within a fixed wavelength range;

actuating said first optical fiber by wavelength dependency amplification characteristics; and actuating said second optical fiber by wavelength dependency absorption characteristics, whereby a wavelength division multiplexing signal input to said first optical fiber undergoes batch amplification from said first optical fiber and then the power of the wavelength division multiplexing signal is flattening using wavelength dependency absorption characteristics of said second optical fiber.

22. The method according to claim 21, wherein said wavelength division multiplexing signal output from said second optical fiber passes through said first optical fiber and is sent to said output port.

23. The method according to claim 21, wherein said wavelength division multiplexing signal that enters from said input port passes through said first optical fiber and is sent to said second optical fiber.

24. The method according to claim 21, wherein said wavelength division multiplexing signal passes through said second optical fiber while said second optical fiber is in a non-pumping state.

25. The method according to claim 21, wherein said wavelength division multiplexing signal passes through said second optical fiber while said second optical fiber is in a pumping state within a range in which an optical signal is not amplified.

26. The method according to claim 21, wherein the pumping state of said second optical fiber changes in response to the state of power input/output/neutral of said wavelength division multiplexing signal.

27. The method according to claim 21, wherein said wavelength division multiplexing signal that enters from said input port passes through said first optical fiber cutting out pumping light and then said wavelength division multiplexing signal from which said pumping light was cut is sent to said second optical fiber.

28. The optical fiber amplifiers according to claim 1, wherein said first and second optical fibers are erbium-doped fibers.

29. The optical fibers amplifiers according to claim 17, wherein said first and second optical fibers are erbium-doped fibers.

30. The optical fiber amplifiers according to claim 21, wherein said first and second optical fibers are erbium-doped fibers.

31. The optical fiber amplifier according to claim 8, wherein based on detection results of said detection means, said pumping light control circuit increases power of said second pumping light in proportion to an increase in input light power and decreases power of said second pumping light in proportion to a decrease in input light power.

\* \* \* \* \*